United States Patent [19]
Shinbo et al.

[11] Patent Number: 5,907,867
[45] Date of Patent: May 25, 1999

[54] TRANSLATION LOOKASIDE BUFFER SUPPORTING MULTIPLE PAGE SIZES

[75] Inventors: Toshinobu Shinbo, Akishima, Japan; Suguru Tachibana, Damascus, Syrian Arab Rep.; Susumu Narita, Tokyo, Japan; Shinichi Yoshioka, Stanford, Calif.; Koichiro Ishibashi, Warabi, Japan; Hisayuki Higuchi, Kokubunji, Japan; Yoshinobu Nakagome, Hamura, Japan; Ikuya Kawasaki, Kodaira, Japan; Saneaki Tamaki, Higashimurayama, Japan

[73] Assignee: Hitachi, Ltd., Tokyo, Japan

[21] Appl. No.: 08/657,231

[22] Filed: Jun. 3, 1996

Related U.S. Application Data

[63] Continuation-in-part of application No. 08/524,561, Sep. 7, 1995.

[30] Foreign Application Priority Data

| Sep. 9, 1994 | [JP] | Japan | 6-241993 |
| Mar. 17, 1995 | [JP] | Japan | 7-86068 |
| Jun. 5, 1995 | [JP] | Japan | 7-138053 |
| Aug. 25, 1995 | [JP] | Japan | 7-240871 |

[51] Int. Cl.$^6$ .................................................. G06F 12/10
[52] U.S. Cl. ............................................. 711/207; 711/212
[58] Field of Search ...................................... 711/203, 206, 711/207, 209, 212, 220

[56] References Cited

U.S. PATENT DOCUMENTS

| 4,525,778 | 6/1985 | Cane | 711/207 |
| 4,835,734 | 5/1989 | Kodaira et al. | 711/209 |
| 4,914,577 | 4/1990 | Stewart et al. | 711/207 |
| 5,058,003 | 10/1991 | White | 711/209 |
| 5,133,058 | 7/1992 | Jensen | 711/207 |
| 5,263,140 | 11/1993 | Riordan | 711/207 |
| 5,375,214 | 12/1994 | Mirza et al. | 711/207 |
| 5,430,856 | 7/1995 | Kinoshita | 711/209 |
| 5,465,337 | 11/1995 | Kong | 711/207 |
| 5,475,827 | 12/1995 | Lee et al. | 711/207 |
| 5,526,504 | 6/1996 | Hsu et al. | 711/207 |
| 5,555,387 | 9/1996 | Branstad et al. | 711/209 |

FOREIGN PATENT DOCUMENTS

| 0508577 | 10/1992 | European Pat. Off. . |
| 5282877 | 10/1993 | Japan ..................... G11C 15/00 |

OTHER PUBLICATIONS

Madhusudhan Talluri Et Al.; "Tradeoffs in Supporting Two Page Sizes"; May 1, 1992; pp. 415–424, vol. 20, No. 2, Computer Architecture News.

Takayanagi, et al.; "2.6 Gbyte/sec Bandwidth Cache/TLB Macro for High–Performance RISC Microprocessor"; Proceedings of Custom Integrated Circuits Conference; pp. 10.2.1–10.2.4, 1991.

(List continued on next page.)

*Primary Examiner*—Eddie P. Chan
*Assistant Examiner*—Kevin Verbrugge
*Attorney, Agent, or Firm*—Loudermilk & Associates

[57] ABSTRACT

A semiconductor integrated circuit device such as a data processing device having a set-associative translation lookaside buffer (TLB). A plurality of address arrays each have a second field for storing the value representing a page size. The values read from the second fields are used to change the range of address comparison by comparators. A plurality of data arrays each have a second field for storing a bit position address designating either an intra-page address or a page number following a page size change. The values read from the second fields of the address arrays are used as the basis for second selectors to select either an address in a predetermined location of an externally input virtual address or the address read from each of the second fields of the data arrays. The selected address is output as a physical address.

4 Claims, 19 Drawing Sheets

OTHER PUBLICATIONS

Gerosa, et al.; "A 2.2W, 80MHz Superscalar RISC Microprocessor"; Journal Solid–State Circuits, vol. 29, No. 12, pp. 1440–1454, Dec. 1994.

Tanaka, et al.; "A 5–ns Access Time CMOS Translation–Lookaside Buffer"; technical report of the Institute of Electronics, Information and Communication Engineers of Japan; ICD92–57, pp. 29–35, 1992.

Takayanagi, et al.; "Embedded Memory Design for a Four Issue Superscalar RISC Processor"; Proceedings of Custom Integrated Circuits Conference, pp. 26.1.1–26.1.6, Jun. 1994.

TIME →

| Value of SZ | Page Size | Value to be Written into PPN[11:10] |
|---|---|---|
| 0 | 1kB | Value on Terminal 5 ("0" or "1") |
| 1 | 4kB | "0" (Value which Inputs of Selector Circuit (Or-And-Not) becomes "L") |
FIG. 10
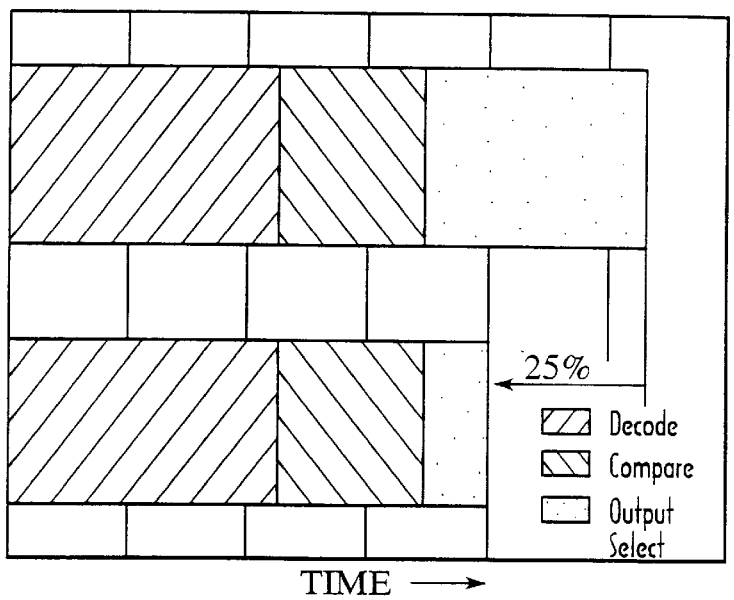
FIG. 11
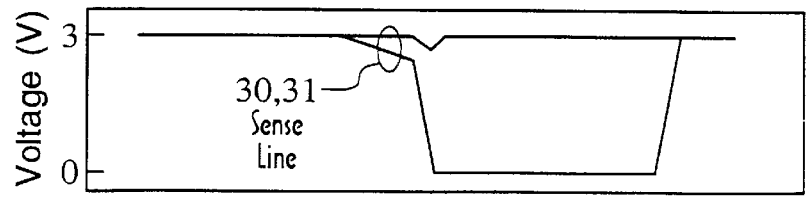
FIG. 12A
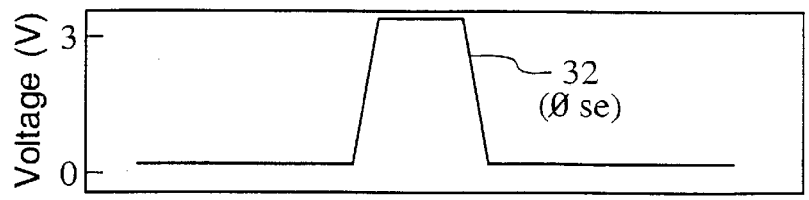
FIG. 12B
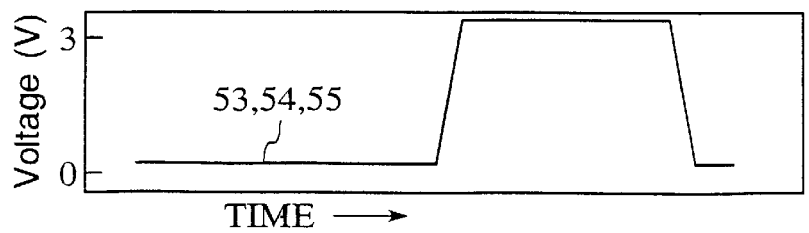
FIG. 12C

TIME →

| VALUE OF SZ | PAGE SIZE | VALUE TO BE WRITTEN INTO PPN[11:10] |
|---|---|---|
| 0 | 1kB | VALUE ON TERMONAL 5 ("0" OR "1") |
| 1 | 4kB | "1" (VALUE WHICH INPUTS OF SELECTOR CIRCUIT (AND-OR-NOT) BECOMES "H") |

TRANSLATION LOOKASIDE BUFFER SUPPORTING MULTIPLE PAGE SIZES

This application is a continuation-in-part application of Ser. No. 08/524,561, filed on Sep. 7, 1995 to S. Yoshioka et al., the disclosure of which is incorporated by reference

BACKGROUND OF THE INVENTION

The present invention relates to a semiconductor integrated circuit device and, more particularly, to a semiconductor integrated circuit device such as a data processing device (microprocessor) having a high-speed CMOS (complementary metal-oxide-semiconductor) TLB (translation look-aside buffer).

The virtual storage method is a known method of memory management for use with microprocessors.

To use the virtual storage method requires establishing correspondence between two kinds of address space: virtual (i.e., logical) address (called VA) space, and real (i.e., physical) address space.

The most common technique by which to have virtual address space correspond with real address space is what is known as the paging system or page segmenting system. The system involves allocating address space in units of pages.

The paging or page segmenting system involves dividing virtual and real address space into contiguous blocks called pages. The virtual (logical) page numbers (VPN) of virtual address space are arranged to match the real (physical) page numbers (PPN) of real address spaces That is, a virtual address is assigned to the real addresses for each of the pages.

Suppose that a virtual address space accessed by a 32-bit virtual address (VA [31 : 0]) is divided into 4-kilobyte (KB) pages. In such a case, the high-order 20 bits of the virtual address (VA[31 : 12]) are used to designate the page number of a page in the virtual address space. The low-order 12 bits (VA [11 : 0]) of the virtual address are used to specify a displacement (or offset) address within the page.

In the description that follows, the notation [m : n] is assumed to indicate the bit positions from bit m to bit n.

A page number in the virtual address space is translated into the corresponding page number in the real address space (the process is called address translation or memory mapping). A page number in the real address space is combined with a replacement address for access to real memory.

It should be noted that the replacement address in each page is not translated.

Translation of a page number in the virtual address space to the corresponding page number in the real address space is carried out by both hardware and software: by a memory management unit (called the MMU), and by the operating system.

High-performance microprocessors generally incorporate a memory with functions for address translation called a translation look-aside buffer (TLB) in order to implement a high-speed virtual storage setup.

The TLB, included in the MMU, translates a given page number of the virtual address space into the corresponding page number of the real address space.

The translation table as a whole for designating correspondence between the page numbers in the virtual address space and those in the real address space (real memory) is held in a page table in main memory or in a secondary storage (memory) device.

A partial copy of the page table is retained in the TLB. The TLB works as a cache memory (address mapping cache memory) for the page table.

The address translation time of the TLB affects the speed of processing by the microprocessor in question. Thus attempts have been made to shorten the address translation time of the TLB.

Part of such attempts are presented illustratively as TLB circuits disclosed in the following two publications for reference:

(A) T. Takayanagi et al., "2.6 Gbyte/sec Bandwidth Cache/TLB Macro for High-Performance RISC Processor" Proceedings of Custom Integrated Circuits Conference, pp. 10.2.1–10.2.4, 1991

(B) G. Gerosa et al., "A 2.2W, 80 MHz Superscalar RISC Microprocessor," J. Solid-State Circuits, Vol. 29, No. 12, pp. 1440–1454, Dec. 1994

The TLB circuit discussed in the reference (A) above takes a total of 12 ns for address translation and cache memory access. The TLB has a match line discharge circuit implemented as a dynamic circuit so as to shorten the address translation time.

The TLB circuit described in the reference (B) attempts to shorten the address translation time by having its comparator arrangement operating as a dynamic circuit.

The virtual storage setup (paging or page segmenting system) operating in units of pages requires as many "address translation pairs" as the number of pages involved.

An address translation pair is a page number of virtual address space paired with the corresponding page number of real address space. These pairs are held in the page table to designate the correspondence between the two kinds of address space.

When the memory space of a fixed storage capacity is divided into pages, the smaller the size of each page (i.e., page size), the larger the number of pages available in the divided memory space.

Conversely, the larger the page size, the smaller the number of pages divided and made available. Larger page sizes mean a smaller number of address translation pairs, which translates into a less memory capacity required for the page table.

However, making the page size too large can increase unusable fields within the pages (due to internal fragmentation). For that reason, high-performance microprocessors recently marketed generally allow any of a plurality of page sizes to be selected for different purposes.

To handle a plurality of page sizes requires that the TLB also accommodate a plurality of page sizes.

In addition to the address translation time and the number of usable page sizes, the so-called hit rate is cited as an important performance indicator of the TLB (the hit rate is a rate at which necessary address translation pairs are found in the TLB).

The hit rate is related to what kind of associative method is in use and how large the size of the TLB is (i.e., the number of entries).

There are two kinds of associative methods CAM (content addressable memory) method, and set-associative method.

The CAM method permits a high hit rate with the use of a small-capacity memory. One disadvantage of this method is that it is difficult to design. Another disadvantage is the tendency of a setup implementing the CAM method to consume large amounts of power. That is, the CAM-based setup has its numerous memory cells incorporate a comparator each, the large number of comparators being liable to dissipate high quantities of power in operation.

On the other hand, although the set-associative method provides a high hit rate only in combination with a large-capacity memory, it nevertheless offers a number of advantages. One such advantage is a low level of power consumption where the degree of association (i.e., number of ways) is low. Another advantage is that a setup implementing the set-associative method is relatively easy to design. Moreover, since most cache memories operate on the set-associative methods the same kind of memory as cache memories may be adopted by the TLB. This reduces the design period of the TLB circuit.

The following publications illustratively disclose a page size variable TLB each:

(C) Tanaka et al., "5-ns Access Time CMOS Translation Look-aside Buffer," technical report of the Institute of Electronics, Information and Communication Engineers of Japan, ICD92-57, pp. 29–35, 1992

(D) Japanese Patent Laid-Open No. Hei 5-282877

The page size variable TLB circuits disclosed in the references (C) and (D) above use a CAM circuit to vary the range of comparison (associative range) between an input virtual address (i.e., its tag field) and the (tag) data held in memory. The associative range is varied in accordance with the memory cell data indicating page sizes. The scheme permits storage of address translation pairs of different page sizes for each of the entries accommodated.

Another page size variable TLB circuit is disclosed illustratively by the following publication:

(E) T. Takayanagi et al., "Embedded Memory Design for a Four Issue Superscalar RISC Processor," Proceedings of Custom Integrated Circuits Conference, pp. 26.1.1–126.1.6, June 1994

The page size variable TLB circuit disclosed in the reference (E) above constitutes a TLB setup that utilizes the set-associative method in varying, according to the page size in effect, those bit positions of a given virtual address which are handled by control signals as an index field in part (an address part for selecting a set-associative set in the virtual address) and as a tag field in another part (an address part of the virtual address for comparison with the data held in the TLB).

SUMMARY OF THE INVENTION

The page size variable TLB circuit disclosed by the publication (C) uses the CAM method in storing address translation pairs of different page sizes for each of the entries. As a CAM setups the disclosed TLB circuit is subject to two disadvantages, in the inability to share circuit design with cache memories, and the tendency to consume large amounts of power, according to studies conducted by the inventors.

Two requirements relevant to the page size variable TLB circuit have thus been recognized. First, it is necessary to share circuit design with cache memories in order to shorten the design period of the TLB circuit. Seconds a set-associative circuit constitution is needed to implement a page size variable TLB circuit that consumes reduced quantities of power.

Meanwhile, it is recognized that the set-associative page size variable TLB circuit discussed in the reference (E) above is incapable of storing address translation pairs of different page sizes for each of the entries. This is because the TLB circuit, when fed with an input virtual address, selects an index field (the address part for selecting a set-associative set in the virtual address) and a tag field (the address part of the virtual address for comparison with the data held in the TLB) through the use of control signals.

In other words, the set-associative page size variable TLB circuit of the reference (E) varies the page size collectively for all address translation pairs in the TLB.

The setup above makes it impossible to retain address translation pairs of a plurality of page sizes simultaneously in the TLB. The TLB circuit is thus incapable of dealing concurrently with a plurality of processes where several page sizes coexist.

Furthermore, although the TLB circuit of the reference (A) attempts to speed up its operation by implementing its match line discharge circuit as a dynamic circuits the disclosed circuit is shown operating only on the CAM method. The reference suggests no other high-speed comparison circuits such as those of the set-associative method.

The TLB circuit disclosed by the reference (B) runs at high speed but its page size is fixed to 4 KB. The disclosed circuit is found to be incapable of storing address translation pairs of different page sizes.

It is therefore an object of the present invention to provide a semiconductor integrated circuit device with a set-associative TLB capable of accommodating address translation pairs of difference page sizes for each of the entries involved.

It is another object of the present invention to provide a semiconductor integrated circuit device with a page size variable set-associative TLB capable of retaining address translation pairs of difference page sizes for each of the entries involved, with the TLB driven in a dynamic manner.

Other objects, features and advantages of the present invention will become apparent in the following specification and accompanying drawings.

In achieving the foregoing and other objects of the present invention and according one aspect thereof, there is provided a semiconductor integrated circuit device with a memory circuit for translating input virtual addresses to real addresses, the memory circuit comprising a plurality of address arrays each having a first field for storing part of a high-order address of a virtual address and a second field for storing the page size of the virtual address; a plurality of data arrays each having a first field for storing part of a high-order address of a real address and a second field for storing at least the remainder of the high-order address of the real address; a decoder for decoding the index address of an input virtual address so as to select specific arrays from the address arrays and the data arrays; a plurality of comparators for varying the range of address comparison on the basis of the values read from the second fields selected by the decoder from the address arrays, the comparators further comparing the addresses read from the first fields selected by the decoder from the address arrays, with part of the high-order address of the input virtual address; a plurality of second selectors acting, in accordance with the values read from the second fields selected by the decoder from the address arrays, to select either the real addresses read from the second fields selected by the decoder from the data arrays, or the address in a predetermined location of the input virtual address; and a first selector acting, on the basis o the result of comparisons by the comparators, to select one of the real addresses read from the first fields selected by the decoder from the data arrays, and one of the addresses selected by the second selectors.

In a first preferred structure according to the invention, the first fields of the address arrays each include: a memory cell made up of a plurality of memory elements on each array; a data line pair connected to a plurality of memory cells and receiving complementary signals therefrom; a sense line pair for receiving the potential of the data line pair via a switching element; a plurality of pre-charge circuits for pre-charging the data line pair and the sense line pair with the potential of a power source; a sense amplifier circuit for amplifying the difference in potential across the sense line pair, the difference stemming from the value read from the memory cell selected by the decoder; and a detection circuit for detecting the change in potential on the sense line pair. The comparators each include: a plurality of exclusive-OR circuits each having two input terminals, one of the two input terminals receiving the output of the detection circuit on each of the address arrays, the other input terminal receiving the value of each of the bits constituting a virtual address; a plurality of NMOS transistors having gate electrodes fed with the outputs from the exclusive-OR circuits; and a hit line connected to the electrodes on one side of the NMOS transistors.

In a second preferred structure according to the invention, the memory circuit further comprises writing means for writing data to the second field of each of the plurality of address arrays. Before a read operation is started, the second selectors select the real addresses read from the second fields selected by the decoder from the data arrays and input the selected real addresses to the first selectors. After the read operation is started, if the values read from the second fields selected by the decoder from the address arrays constitute values for selecting an address in a predetermined location of the input virtual address, the second selectors include input means for selecting the address in the predetermined location of the input virtual address in place of the real addresses read from the second fields of the data arrays and for inputting the selected address to the first selector. The writing means performs a predetermined logic operation between the values to be written to the second fields of the address arrays and the real addresses to be written to the second fields of the data arrays and, after the read operation is started if the address in the predetermined location of the input virtual address is selected, the writing means writes to the second fields of the data arrays the value held by the first selector prior to the read operation.

In a third preferred structure according to the invention, the memory circuit further comprises logic means disposed between the second selectors and the first selector. Before a read operation is started the second selectors select the real addresses read from the second fields selected by the decoder from the data arrays. After the read operation is started if the values read from the second fields selected by the decoder from the address arrays constitute values for selecting an address in a predetermined location of the input virtual address, the second selectors include input means for selecting the address in the predetermined location of the input virtual address in place of the real addresses read from the second fields of the data arrays and for inputting the selected address to the first selector. The logic means performs a predetermined logic operation between the addresses selected by the second selectors and a signal having a delay equivalent to that of the values read from the second fields selected by the decoder from the address arrays, the logic means including output means for outputting the result of the logic operation to the first selectors.

In the semiconductor integrated circuit device with a set-associative TLB according to the above one aspect of the invention, the address arrays each have the second field for storing a value representing a page size. The values read from the second fields are used to change the range of comparisons to be performed by the comparators.

The second fields of the data arrays each accommodate a bit position address designating either an intra-page address or a page number following a page size change.

If the values read from the second fields of the address arrays indicate an intra-page address to be stored into the second fields of the data arrays, an address in a predetermined location of the externally input virtual address is selected by the second selectors and is output as a physical address.

If the values read from the second fields of the address arrays indicate a page number to be stored into the second fields of the data arrays the addresses read from the second fields of the data arrays are selected by the second selectors and are output as physical addresses.

The structure above makes it possible to compare bits pursuant to the page size stored in each of the entries in the address arrays. Where the page size is changed and the offset bit positions are varied, the correct offset value is still output.

In the first preferred structure of the invention, the semiconductor integrated circuit device with the set-associative TLB uses pre-charge circuits to pre-charge the data line pairs and sense line pairs of the address arrays with the potential of the power source. Each sense line pair receives the potential of the corresponding data line pair via a switching element.

The difference in potential developed across a given sense line pair and stemming from the value read from the selected memory cell is amplified by a sense amplifier circuit. The change in potential on the sense line pair is detected by a detection circuit, and transmitted to a one-bit exclusive-OR circuit.

The one-bit exclusive-OR circuit compares the address stored in the memory cell with the input virtual address. The result of the comparison is input to the gate of an NMOS transistor whose source is commonly connected to the hit line.

The structure above allows each one-bit exclusive-OR circuit to perform a compare operation immediately after the sense amplifier is operated and the potential on the sense line pair is established. This eliminates extra timing margins and increases the operating speed.

In the second preferred structure of the inventions before a read operation is started, the second selectors select the real addresses read from the second fields of the data arrays, and input the selected real addresses to the first selector. After the read operation is started, if the values read from the second fields of the address arrays indicate an intra-page address to be stored into the second fields of the data arrays, the second selectors select an address in a predetermined location of the input virtual address in place of the real addresses read from the second fields of the data arrays. The selected address is input to the first selector.

The writing means of the above structure performs a predetermined logic operation between the values to be written to the second fields of the address arrays and the real addresses to be written to the second fields of the data arrays. After the read operation is started, if the address in the predetermined location of the input virtual address is selected, the writing means writes to the second fields of the data arrays the value held by the first selector prior to the read operation.

Constituted as described, the above preferred structure of the invention prevents the racing of signals and suppresses increases in the address translation time.

In the third preferred structure of the invention, before a read operation is started, the second selectors select the real addresses read from the second fields of the data arrays. After the read operation is started, if the values read from the second fields of the address arrays indicate an intra-page address to be stored into the second fields of the data arrays, the second selectors select an address in a predetermined location of the input virtual address. The logic means of the structure above performs a predetermined logic operation between the addresses selected by the second selectors and a signal having a delay equivalent to that of the values read from the second fields of the address arrays. The result of the logic operation is output to the first selector.

The preferred structure above also prevents the racing of signals and suppresses increases in the address translation time.

BRIEF DESCRIPTION OF THE DRAWINGS

FIG. 10 is a view explaining how the first embodiment controls write operations to the field SZ shown in FIG. 1 and indicating the page size;

FIG. 11 is a view depicting the effect of the write control method explained in FIG. 10;

FIGS. 12A to 12K are views waveforms applicable when the selector circuit of FIG. 8 is in operation and the control method of FIG. 10 is in effect;

DESCRIPTION OF THE PREFERRED EMBODIMENTS

Figure 1:
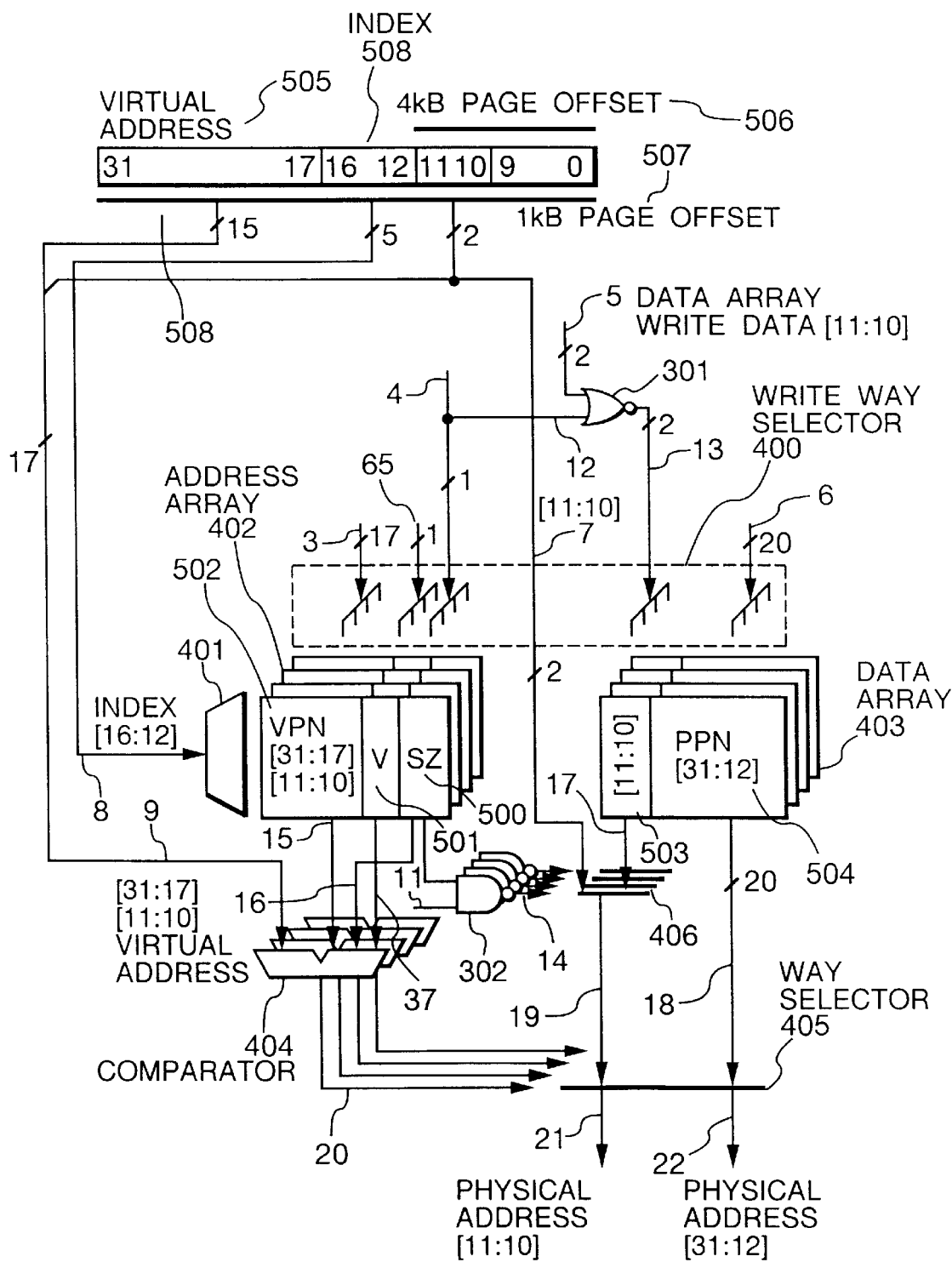
FIG. 1 is a schematic block diagram of a page size variable set-associative TLB practiced as a first embodiment of the invention.

The present invention applies to a translation look-aside buffer (TLB1) for use with a data processing device such as the microcomputer or microprocessor shown in FIG. 7 of the preceding application of Ser. No. 08/524,561. This microprocessor is formed by known semiconductor integrated circuit fabrication techniques on a single semiconductor substrate (chip) made illustratively of single crystal silicon. It will be clear to those skilled in the art that FIG. 1 of the present application is a more specific elaboration of FIG. 1 in the preceding application.

Preferred embodiments of the present invention will now be described with reference to the accompanying drawings. In referring to the drawings for explanation of the embodiments, like reference numerals designate like or corresponding parts, and any repetitive description of such parts is omitted.

First Embodiment

FIG. 1 is a schematic block diagram of a page size variable set-associative translation look-aside buffer (TLB) practiced as the first embodiment of the invention.

The TLB in FIG. 1 is of a four-way set-associative type. This page size variable set-associative TLB stores address translation pairs of two page sizes, 1KB and 4KB, and has 32 sets and 128 entries.

The page size variable set-associative TLB of FIG. 1 comprises a write way selector 400, a decoder 401, address arrays 402, data arrays 403, comparators 404, and a way selector circuit 405.

The address arrays 402 each include a tag field (VPN [31 : 7], VPN [11 : 10]) 502 that stores a tag, a valid (V) bit 501 that is an identifier indicating whether the address translation pair (an address array tag paired with the real page number of a data array) stored in the entry in question is valid or not, and a field SZ (500) containing a bit that indicates the page size.

The VPN stands for a virtual page number, i.e., the number of a page in virtual address space. In the description that follows, the notation [m : n] indicates the bit positions from bit m to bit n.

The data arrays 403 each include a bit position data field ([11 : 10]) 503 having bit position data designating either an intra-page address (offset) or a page number following a page size change per entry, and another bit position data field ([31 : 12]) 504 having bit position data always subject to translation.

The decoder 401 decodes an index field (VA [16 : 12]) in a virtual address (VA [31 : 0]), and selects four entries applicable to the same index field from the address arrays 402 and data arrays 403.

After one set of entries is thus read out, the comparators 404 compare the tag field (VPN [31 : 17] and VPN [11 : 10]) of the address arrays 402 with the tag field (VA [31 : 17] and VA [11 : 10]) of a virtual address 505.

After the comparison, the comparators 404 output a hit signal 20 indicating the result of the compare operation. The hit signal 20 is a way select signal for selecting the way that is hit.

Out of the data (18, 19) read from the data arrays 403, way data is selected. The way data is data about the way wherein the tag field (VPN [31 : 17] and VPN [11 : 10]) 15 of the address array 402 matches the tag field (VA [31 : 17] an VA [11 : 10]) of the virtual address 505 and wherein the valid (V) bit 501 (37) indicates 1. The way data is selected by the 4 : 1 way selector circuit 405 and is output as a physical address (21, 22).

With the first embodiment, the address translation pair held in a given entry is valid when the valid (V) bit 501 is 1.

The first embodiment adopts the constitution described below in order to store address translation pairs of two page sizes, 1KB and 4KB.

If the page size in the virtual address 505 is 1KB, then bits 9 through 0 (VA [9 : 0]) constitute an offset. If the page size is 4KB, then bits 11 through 0 (VA [11 : 0]) 506 provide the offset.

It follows that bits 11 and 10 (VA [11 : 10]) in the virtual address 505 become either part of the offset or part of the virtual page number.

The page size of the address translation pair held in a given entry is not known in advance. An address translation pair with the page size of either 1KB or 4KB may be stored in each entry.

This means that bits 11 and 10 (VA [11 : 10]) that can turn into an offset in the virtual address 505 cannot be included in the index (i.e., address for selecting a set). Instead, an address portion higher in order than bits 11 and 10 (VA [11 : 10]) of the virtual address 505 must be used as the index.

The page size variable set-associative TLB in FIG. 1 is of a four-way set-associative constitution (32 sets) with 128 entries. Thus the index field is five bits long, i.e. bits 16 through 12 (VA [16 : 12]) in the virtual address 505.

If the page size is 1KB, then bits 11 and 10 (VA [11 : 10]) in the virtual address 505 is part of a virtual page number. As such, the bits must be treated as the tag field of the virtual address 505.

For this reason, each of the address arrays 402 also includes a field for accommodating bits 11 and 10 (VPN [11 : 10]).

In addition, each entry has the field SZ (500) containing a bit designating a page size. The value (16 in FIG. 1) read from the field SZ (500) determines whether or not to include bits 11 and 10 ([11 : 10]) in the compare operation.

With the first embodiment, a bit value of 1 in the field SZ (500) designates the page size of 4KB; a bit value of 0 in the field SZ (500) specifies the page size of 1KB.

When the bit value (16) read from the field SZ (500) is 0, the comparators compare bits 31 through 17 (VPN [31 : 17] and VPN [11 : 10]) read from the address arrays 502, with bits 31 through 17 (VA [31 : 17]) and bits 11 and 10 (VA [11 : 10] in the virtual address 505.

When the bit value (16) read from the field SZ (500) is 1, the comparators compare bits 31 through 17 (VPN [31 : 17]) read from the address arrays 402, with bits 31 through 17 (VA [31 : 17]) alone in the virtual address 505.

In the above setup, the result (20) of the compare operation is arranged to indicate a hit if the value read from the address arrays 502 matches the value in the input virtual address 505 and if the valid (V) bit 501 is 1.

Bits 16 through 12 (VA [16 : 12]) in the virtual address 505 constitute a five-bit index that is higher in order than the offset (VA [11 : 10]) in effect when the page size is 4KB. This means that where the page size is 1KB, two bits (VA [11 : 10]) that are lower in order than the index must be included in the tag field.

When the page size is 1KB, the real page number corresponding to the virtual address 505 wherein bits 31 through 17 (VA [31 : 17]) are the same and bits 11 and 10 (VA [11 : 10]) are different is thus mapped to the same set. This increases the possibility of collision.

In the TLB of FIG. 1, however, the tag field lower in order than the index is two bits long and part of the four-way set-associative constitution. Thus all translation pairs that can pose the possibility of collision are stored in the same set. This arrangement averts the problem of collision.

Where the number of ways is small or where the number of bits making up the tag field that is lower in order than the index is large, the function for selecting a set is subjected to appropriate hashing. This also minimizes the possibility of collision.

When the page size is 4KB, bits 11 and 10 (VA [11 : 10]) in the virtual address 505 constitute part of the offset. Bits 11 and 10 (VA [11 : 10]) in the virtual address 505 are thus not subject to translation. When the page size is 1KB, bits 11 and 10 (VA [11 : 10]) in the virtual address 505 make up part of a virtual page number which must be translated into a physical page number.

In such cases, the bit value (16) read from the field SZ (500) determines the selection of one of two alternatives: bits 11 and 10 (17) read from the field 503 ([11 : 10]) of the data arrays 403, or bits 11 and 10 (VA [11 : 10]) in the virtual address 505. The selected bits are output as a physical address 21.

When the field SZ (500) has a bit value of 1, the page size is 4KB. The intra-page offset is constituted by 12 bits, i.e., bits 11 through 0 (VA [11 : 0]) in the virtual address 505. A selector circuit 406 is then controlled so that bits 11 and 10 (7 in FIG. 1)(VA [11 : 10]) in the virtual address 505 are output unmodified as bits 11 and 10 (21 in FIG. 1) of the physical address.

When the field SZ (500) has a bit value of 0, the page size is 1KB. The intra-page offset is constituted by 10 bits, i.e., bits 9 through 0 (VA [9 : 0]) in the virtual address 505. The selector circuit 406 is then controlled so that bits 11 and 10 (17)(VA [11 : 10]) in the virtual address 505 are output unmodified as bits 11 and 10 (21).

Constituted as described, the TLB shown in FIG. 1 stores address translation pairs of different page sizes for each of the entries involved.

In a write operation, the write way selector 400 selects the way to which to write data and writes the data thereto. Needless to say, the set is selected by the decoder 401 in the write operation as well as in the read operation. How write data is controlled by a NOR gate 301 and by other parts will be described later in detail.

The TLB of FIG. 1 includes NAND circuits 302. These circuits are used to read the contents of the data arrays whenever tests are carried out. This is a forced read operation supplementing the above-described ordinary read operation (i.e., associative read) involving the TLB, That is, as described, the value (16) read from the field SZ (500) determines the selection and output of one of two alternatives: bits 11 and 10 (17) read from the field 503 ([11 : 10]) of the data arrays 403, or bits 11 and 10 (VA[11 : 10]) in the virtual address 505. The selected bits are output as the physical address 21. In addition to that process, bringing a control signal 11 Low allows the selector circuit 406 to select bits 11 and 10 (17) read from the field ([11 : 10]) 503 of the data arrays 403 regardless of the value in the field SZ (500).

FIG. 1 shows a typical four-way set-associative TLB. Alternatively, it will be understood that adopting a single-way setup easily constitutes a direct mapping TLB whereby each page is mapped uniquely in a specific location of the TLB.

The structure for speeding up the operation of the TLB in FIG. 1 will now be described with reference to FIGS. 1 through 9.

Figure 2:
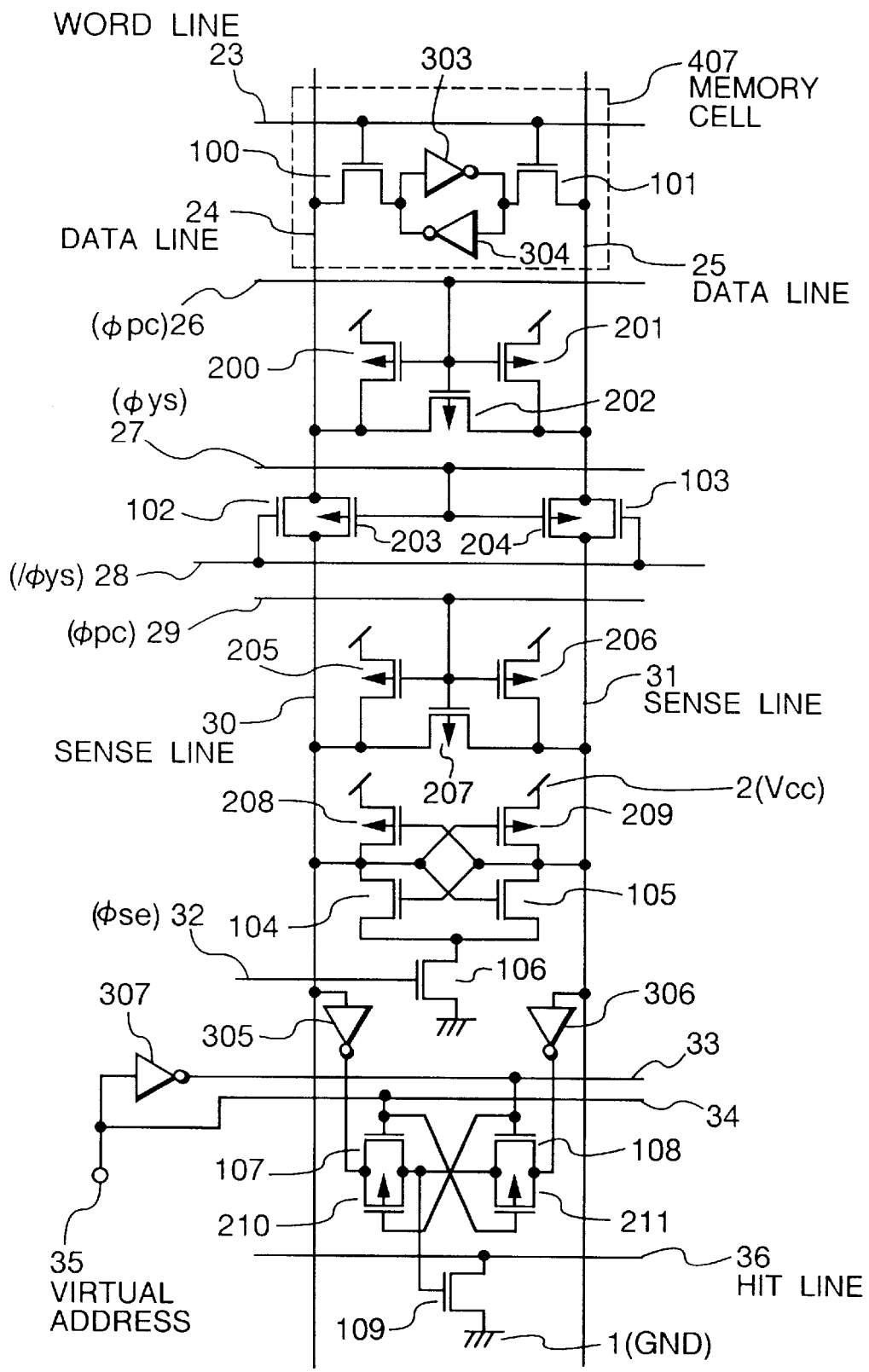
FIG. 2 is a circuit diagram showing a specific circuit constitution of one of the one-bit comparators in the first embodiment.

FIG. 2 is a circuit diagram showing a specific circuit constitution of one of the one-bit comparators 404 (exclusive-OR circuits) in FIGS. 3A to 3H are views of waveforms applicable when the comparator of FIG. 2 is in operation.

In FIG. 2, N-channel (first conductivity type) MOS transistors 107 and 108 (called NMOS transistors) and P-channel (second conductivity type) MOS transistors 210 and 211 (called PMOS transistors) make up a one-bit comparator.

A single one-bit comparator, as shown in FIG. 2, is furnished to each of the columns of the address arrays 402 (memory cell arrays).

How the comparator of FIG. 2 works will now be described with reference to FIGS. 3A to 3H.

PMOS transistors 200 through 202 and 205 through 207 pre-charge data lines 24 and 25 and sense lines 30 and 31 with a positive potential of a power source (Vcc).

The sense lines 30 and 31 are signal line portions separated from the data lines 24 and 25 by transfer MOS transistors 102, 103, 203 and 204.

After the pre-charge operations pre-charge signals 26 and 29 ($\phi$pc) for the data lines 24 and 25 and sense lines 30 and 31 are driven High. This turns off the pre-charging PMOS transistors 200 through 202 and 205 through 207. Then a word line 23 is brought High.

Bringing the word line 23 High causes a read current to flow to a memory cell 407. This develops potential differences on the data lines 24 and 25 as well as on sense lines 30 and 31.

When a sufficient difference of potential has developed across the sense lines 30 and 31 a y-switch MOS transistor control signal 27 ($\phi$ys) is driven High. This turns off the transfer MOS transistors 102, 103, 203 and 204 which are y-switch MOS transistors and thereby isolates the sense lines 30 and 31 from the data lines 24 and 25.

At the same time, a sense amplifier start signal 32 ($\phi$se) is driven High. This activates a sense amplifier constituted by MOS transistors 208, 209, 104, 105 and 106.

Figure 3A:
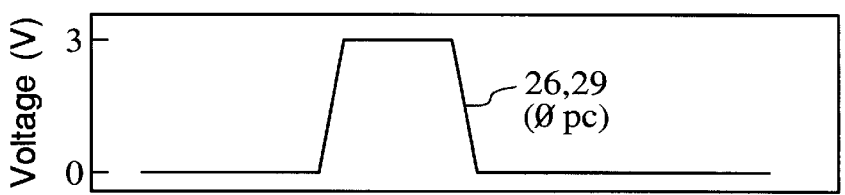
FIGS. 3A to 3H are views of waveforms applicable when the comparator of FIG. 2 is in operation.
Figure 3B:
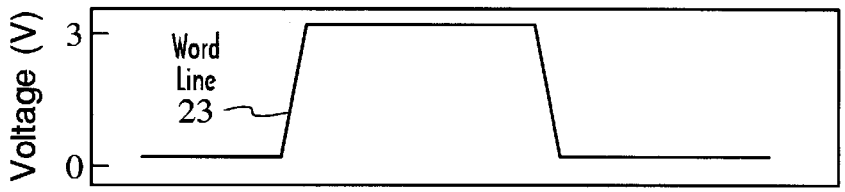
Figure 3C:
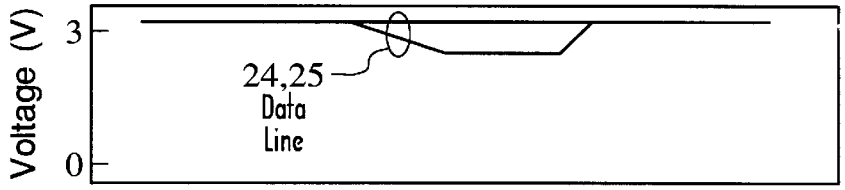
Figure 3D:
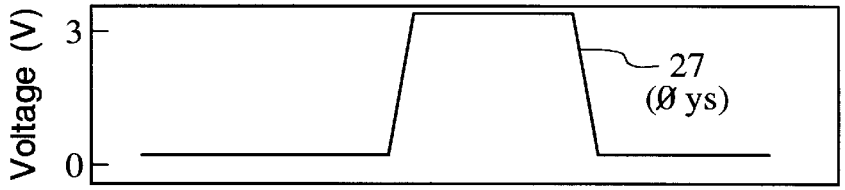
Figure 3E:
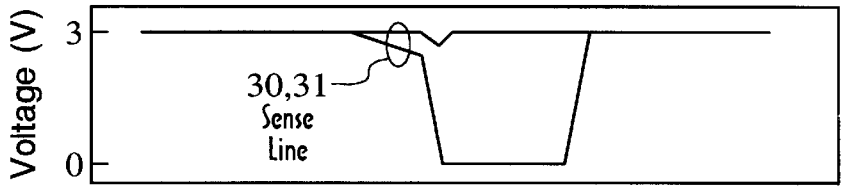
Figure 3F:
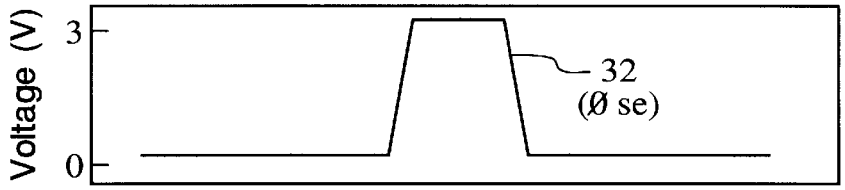
Figure 3G:
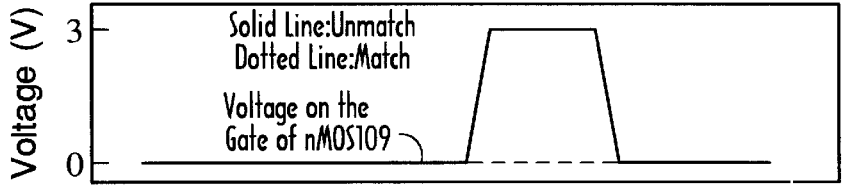
Figure 3H:
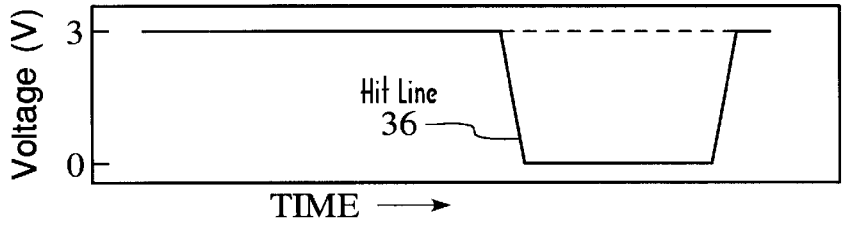

The moment the sense lines 30 and 31 are isolated from the data lines 24 and 25, the read current to the memory cell 407 becomes irrelevant to signals on the sense lines 30 and 31. Thus the word line 23 may be brought Low as shown in FIG. 3B.

When the sense lines 30 and 31 are isolated from the data lines 24 and 25, the load capacity of the sense lines 30 and 31 is reduced. This translates into a higher operating speed.

The virtual address 505 to be compared needs to be established before the sense amplifier start signal 32 ($\phi$se) is driven High. Thus when the sense amplifier is operated, one of the sense line pair 30 and 31 bears ground potential (0 V).

An inverter 307 and other parts are used to set signal polarities in such a manner that when one bit (35) in the virtual address 505 matches one bit read from the memory cell 407, the gate potential of an NMOS transistor 109 is brought Low, and that in case of a mismatch between the two bits, the gate potential of the NMOS transistor 109 is driven High.

That is, the NMOS transistors 107 and 108 and the PMOS transistors 210 and 211 operate as a circuit that outputs the result of the exclusive-OR of one bit (35) in the virtual address 505 and one bit from the memory cell 407 to the gate of the NMOS transistor 109.

It should be noted here that the data lines 24 and 25 and the sense lines 30 and 31 are pre-charged with the potential Vcc. Thus the output of inverters 305 and 306 remains Low.

This means that before the sense amplifier is operated to bring one of the sense line pairs 30 and 31 Low, the gate potential of the NMOS transistor 109 is Low regardless of the match or mismatch between one bit (35) in the virtual address 505 and one bit from the memory cell 407.

When the sense amplifier is operated, one of the sense lines 30 and 31 is driven Low. If one bit (35) in the virtual address 505 fails to match one bit read from the memory cell 407, the NMOS transistor 109, is turned on to discharge the signal line 36 that has been pre-charged with the potential Vcc.

In the description that follows, the signal line 36 for obtaining the result of the compare operation is called a hit line.

When one bit (35) in the virtual address 505 matches one bit read from the memory cell 407, the NMOS transistor 109 remains off and the hit line 36 stays High.

In FIGS. 3A to 3H solid line waveforms apply when one bit (35) in the virtual address 505 fails to match one bit read from the memory cell 407. Dotted line waveforms in FIG. 3 apply when the two bits match.

The hit line 36 may be connected to a plurality of hit line discharging NMOS transistors (i.e., as many as the number of bits to be compared) equivalent to the NMOS transistor 109 each. This permits the compare operation on the necessary number of bits to be compared. More detailed aspects of this circuit constitution will be described later with reference to FIG. 4.

In case of a mismatch between one bit (35) in the virtual address 505 and one bit read from the memory cell 407, the hit line 36 is driven Low. This causes the circuit of FIG. 4, to be described later, and the way selector circuit 405 to select the read data from the data arrays 403. Then the sense amplifier start signal 32 ($\phi$se) is brought Low to turn off the sense amplifier. The pre-charge signals 26 and 29 ($\phi$pc) for the data lines 24 and 25 and for the sense lines 30 and 31 as well as the y-switch MOS transistor control signal 27 ($\phi$ys) are also brought Low. This pre-charges the data lines 24 and 25 and the sense lines 30 and 31 in preparation for the next cycle.

Pre-charging the sense lines 30 and 31 drives Low the gate potential of the NMOS transistor l09. Thereafter, the hit line 36 is driven High in preparation for the next cycle.

As described, the pre-charge transistors associated with the data lines 24 and 25 and sense lines 30 and 31 are made up of PMOS transistors. The input polarities of the comparator (of MOS transistors 107, 108, 210 and 211) are set in such a manner that the result of the compare operation at pre-charge time will be the same as that given when one bit (35) in the virtual address 505 matches the data read from the memory cell 407.

With the above settings established, the operation of the sense amplifier (of MOS transistors 208, 209, 104, 105 and 106) is ensured by simply designing the timing of the start signal 32 (φse) for starting the sense amplifier.

With the sense amplifier started, one of the sense line pair 30 and 31 is driven Low, which starts the comparison between the virtual address 505 and the read data. There is no need to provide specific timings for the compare operation.

The first embodiment thus eliminates the need for extra timing margins. This translates into a higher operating speed.

Figure 4:
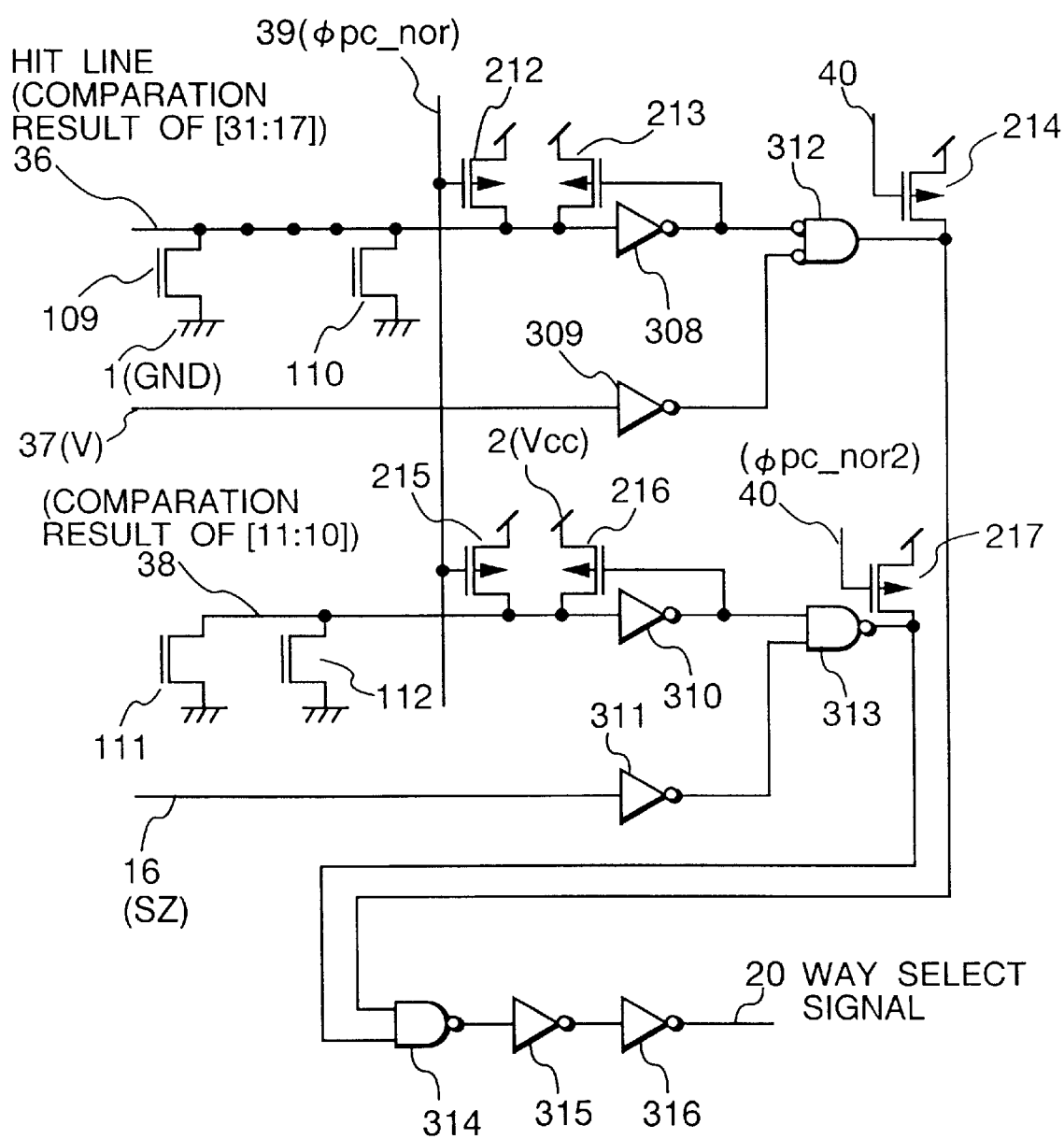
FIG. 4 is a circuit diagram of a way select signal generating circuit for selecting a hit way based on the output from the one-bit comparator of FIG. 2.

FIG. 4 is a circuit diagram of a way select signal generating circuit for selecting a hit way based on the output from the one-bit comparator (exclusive-OR circuit) of FIG. 2. The way select signal generating circuit of FIG. 4 and the comparator of FIG. 2 constitute the comparator 404 shown in FIG. 1.

What follows is a description of how the way select signal generating circuit of FIG. 4 operates.

NMOS transistors 109, 110, 111 and 112 in FIG. 4 include NMOS transistors for discharging the hit line 36 of the exclusive-OR circuit on each column shown in FIG. 2, and NMOS transistors for discharging the hit lines for other comparable columns.

PROS transistors 212, 215, 214 and 217 pre-charge the hit lines 36 and 38, the output of a NOR circuit 312 and the output of an AND circuit 313 with the positive potential of the power source (Vcc).

A pre-charge signal 39 (φpc_nor) and a pre-charge signal 40 (φpc_nor2) are driven High to turn off the pre-charging PMOS transistors 212, 215, 214 and 217. Thereafter, the tag field read from the address arrays 402 (VPN [31 : 17] and VPN [11 : 10]) starts to be compared with the tag field in the virtual address 505 (VA [31 : 17] and VA [11 : 10]).

In the description that follows, the NOR circuit refers to a two-input AND circuit that receives two inverted input signals. An example of this circuit is the NOR circuit 312 shown in FIG. 4.

When the hit lines 36 and 38, the output of the NOR circuit 312 and the output of the AND circuit 313 are pre-charged as described, these lines and outputs are driven High. At the same time, the pre-charge operation brings the output of a NAND circuit 314 Low and a way select signal 20 also Low.

Each of the ways is provided with a single way select signal generating circuit for generating the way select signal 20. The way select signal 20 indicates whether the way in question has a hit or a miss upon an associative read operation. In the description that follows, a hit refers to the case in which the tag field read from the address arrays 402 matches the tag field in the virtual address 505 upon comparison; a miss refers to the case wherein the two tag fields compared fail to match.

The pre-charge operation places the way select signals 20 for all ways (there are four way select signals for the four ways of the TLB in FIG. 1) into the hit state (Low in FIG. 4). When a hit way is found upon comparison between the tag field from the address arrays 402 and the tag field in the virtual address 505, the way select signal 20 for that way remains in the hit state (Low); the way select signals 20 for the other ways enter the miss state (High).

If all ways turn out to have misses, all way select signals 20 for all ways enter the miss state (High).

As will be described later, the way select signal 20 is utilized to control the way selector circuit 405 and to select the read data from the data arrays 403.

After the read data from the data arrays 403 is selected, the hit lines 36 and 38 as well as the outputs of the AND circuits 312 and 313 are pre-charged again. This process is the same as in the case of FIG. 2.

As discussed in connection with the comparator in FIG. 2, a compare operation is started by bringing the sense amplifier start signal 32 (φse) High. When one bit in a predetermined location of the virtual address 505 fails to match one bit read from the memory cell, the NMOS transistor 109, 110, 111 or 112 is turned on.

Thus a mismatch of at least one bit between bits 31 through 17 (VPN [31 : 17]) read from the address arrays 402 and bits 31 through 17 (VA [31 : 17]) in the virtual address 505 causes the hit line 36 to be driven Low. A mismatch of at least one bit between bits 11-10 (VPN [11 : 10]) read from the address arrays 402 and bits 11-10 (VA [11 : 10]) in the virtual address 505 causes the bit line 38 to be brought Low.

With the hit line 36 brought Low, the output of an inverter 308 is driven High. At the same time, the output of the NOR circuit 312 is driven Low and the output of the NAND circuit 314 is brought High.

Because the output of the NAND circuit 314 is brought High, the way select signal 20 enters the miss state (High).

PMOS transistors 213 and 216 in FIG. 4 are circuit elements that keep the potential of the hit lines 36 and 38 High when bits 31 through 17 (VPN [31 : 17]) and bits 11-10 (VPN [11 : 10]) read from the address arrays 402 match bits 31 through 17 (VA [31 : 17]) and bits 11-10 (VA [11 : 10]) in the virtual address 505.

FIG. 4 shows a setup in which the output of the inverter 308 and that of an inverter 310 are fed back. Alternatively, it is evident that a sufficiently large static resistance arrangement serves the same purpose.

The value of the way select signal must be changed in accordance with the value (37) of the valid (V) bit 501 indicating whether or not the address translation pair stored in the entry in question is valid. In order to execute this features the circuit of FIG. 4 is supplemented by the NOR circuit 312.

When the value (37) of the valid (V) bit 501 is 0 (Low), the output of an inverter 309 is brought High regardless of the result of the comparison between the tag field (VPN [31 : 17] and VPN [11 : 10]) from the address arrays 402 and the tag field (VA [31 : 17] and VA [11 : 10]) in the virtual address 505.

With the output of the inverter 309 thus brought High, the output of the NOR circuit 312 is driven Low. At the same time, the output of the NAND circuit 314 is driven High and the way select signal 20 is also driven High.

That is, in the circuit of FIG. 4, the way select signal 20 enters the miss state if the value (37) of the valid (V) bit 501 is 0 regardless of the result of the comparison between the tag field (VPN [31 : 17] and VPN [11 : 10]) from the address arrays 402 and the tag field (VA [31 : 17] and VA [11 : 10]) in the virtual address 505.

With the first embodiment, the range of address comparison (i.e., associative range) for the comparators is varied depending on the value (16) of the field SZ (500) indicating the page size. More about this aspect will be described later.

As discussed in connection with the TLB of FIG. 1, when the value (16) read from the field SZ (500) is 0 (for 1KB pages), a comparison is made between bits 31 through 17 (VPN [31 : 17]) as well as bits 11-10 (VPN [11 : 10]) from the address arrays 402 on the one hand, and bits 31 through 17 (VA [31 : 17]) as well as bits 11-10 VA [11 : 10]) in the virtual address 505 on the other.

When the value (16) read from the field SZ (500) is 1 (for 4KB pages), a comparison must be made between bits 31 through 17 (VPN [31 : 17]) from the address arrays 402 and bits 31 through 17 (VA [31 : 17]) in the virtual address 505.

For the above operations to be accomplished, the way select signal generating circuit of FIG. 4 includes the NAND circuit 313.

When the value (16) of the field SZ (500) is 0 (Low), the output of an inverter 311 is driven High. This causes the output of NAND circuit 313 to be varied depending on the output of the hit line 38, i.e., on the result of the comparison between bits 11-10 (VPN [11 : 10]) from the address arrays 402 and bits 11-10 (VA [11 : 10]) in the virtual address 505.

Where there is a match between bits 11-10 (VPN [11 : 10]) from the address arrays 402 and bits 11-10 (VA [11 : 10]) in the virtual address 505 and where the hit line 38 is driven High correspondingly, the output of the inverter 310 is brought Low while the output of the NAND circuit 313 is driven High.

In case of a match between bits 31 through 17 (VPN [31 : 17]) from the address arrays 402 and bits 31 through 17 (VA [31 : 17]) in the virtual address 505, the output of the NAND circuit 314 is driven Low. The way select signal 20 remains in the hit state (Low).

When there is a mismatch between bits 11-10 (VPN [11 : 10]) from the address arrays 402 and bits 11-10 (VA [11 : 10]) in the virtual address 505 and when the hit line 38 is driven Low accordingly, the output of the inverter 310 is brought High, the output of the NAND circuit 313 is driven Low, and the output of the NAND circuit 314 is brought High. At the same time, the way select signal 20 enters the miss state (High).

When the value (16) read from the field SZ (500) is 1, the output of the inverter 311 is driven Low. In that case, the output of the NAND circuit 313 is brought High regardless of the result of the comparison between bits 11-10 (VPN [11 : 10]) from the address arrays 402 and bits 11-10 (VA [11 : 10]) in the virtual address 505.

As described, the way select signal 20 is determined by two factors: by the result of the comparison between bits 31 through 17 (VPN [31 : 17]) from the address arrays 402 and bits 31 through 17 (VA [31 : 17]) in the virtual address 505, and by the value (37) of the valid (V) bit 501.

The above-described constitution allows the range of comparisons by the comparators to be varied depending on the value (16) of the bit field SZ (500) indicating the page size. Thus the page size may be changed for each of the entries involved.

The way select signal generating circuit of FIG. 4 adopts the following arrangements for enhancing the operating speed:

Although the setup illustrated in FIG. 4 shows only two transistors i.e., NMOS transistors 109 and 110, there may be provided as many transistors as the number of bits to be compared. With the first embodiment, 15 transistors are connected in parallel.

The NMOS transistors 109, 110, 111 and 112 in operation constitute a NOR circuit. This NOR circuit serves to discharge the pre-charged hit lines 36 and 38.

The arrangement above is a dynamic circuit in which the transistors for implementing logic functions are made up of NMOS transistors alone. This type of dynamic circuit is faster than the static type of circuits having the same input capacity but composed of CMOS transistors.

In addition, the logic thresholds of the inverters 308 and 310, NOR circuit 312, NAND circuits 313 and 314, and inverters 315 and 316 may be shifted in a suitable manner. This further improves the operating speed of the dynamic circuit.

Specifically, the gate width of the PMOS transistors is designed to be greater than that of the NMOS transistors in the inverters 308 and 310, NAND circuit 314 and inverter 316 in order to shorten the rise time of their output signals. The logic thresholds involved are set to be higher than Vcc/2 for the same reason.

The gate width of the NMOS transistors is designed to be greater than that of the PMOS transistors in the NOR circuit 312, NAND circuit 313 and inverter circuit 315 in order to shorten the fall time of their output signals. The logic thresholds in this case are set to be lower than Vcc/2.

The above arrangements, once in place, shorten the delay time that elapses when the way select signal 20 placed in the hit state (Low) by the pre-charge operation changes into the miss state (High).

The delay time that elapses when the way select signal 20 changes from the hit state (Low) to the miss state (High) is called a forward delay time. Conversely, the delay time in effect when the way select signal 20 changes from the miss state (High) to the hit state (Low) is called a backward delay time.

Although the delay time tends to be longer when the way select signal 20 changes from the miss state (High) to the hit state (Low), only the forward delay time affects the address translation time. Thus if the way select signal 20 is placed into the hit state (i.e., brought Low) within an operation cycle time, the address translation time may be shortened without increasing the cycle time.

The shifting of logic thresholds may be supplemented by another obvious arrangement. That is, a trade-off between the rise in power consumption by the clock and the cycle time is taken into account in conjunction with the pre-charge operation of the PMOS transistors 214 and 217 shown in FIG. 4. In this setup, executing a pre-charge operation increases the power consumption by a clock line 40 but shortens the backward delay time.

FIG. 4 shows only a single-hit-line setup with the NMOS transistors 109 and 110 connected to 15 transistors in parallel implementing a multiple-input NOR function (15 inputs admitted in the example of FIG. 4). An alternative to this setup, not shown in FIG. 4, is to divide the NMOS transistors 109 and 110 illustratively into an eight-input NOR circuit and a seven-input NOR circuits with the NOR circuit 312 turned into a three-input NOR circuit in order to equalize the load capacity for higher operating speeds.

The preceding structure may be adopted advantageously for the setup of FIG. 4 because the parasitic capacity of the hit line 36 tends to become high.

The constitution described above permits implementation of a high-speed comparator arrangement for variable ranges of comparison.

In addition, the way select signal generating circuit depicted in FIG. 4 adopts the following arrangements to reduce the area it occupies in the chip:

The hit lines 36 and 38, as described, make up a dynamic circuit for high-speed operation. In the actual layout, the hit lines 36 and 38 for four ways are furnished side by side.

Since only one way has a hits three of the four contiguous hit lines change in potential from the High to the Low state. The remaining one hit line remains High.

This means that the hit line (36 or 38) having a hit can suffer from a drop in its High level. This drop in potential is approximately comparable to the ratio of the line capacity between the coupled contiguous lines to the total line capacity.

Where the logic thresholds for the inverters 308 and 310 are raised for a higher operating speed, their operative margins are reduced. Thus it is preferable that the hit lines 36 and 38 making up the dynamic circuit be shielded from the contiguous lines. However, such an arrangement necessarily increases the area occupied by the way select signal generating circuit.

Any increase in the occupied area is minimized as follows: the signal lines for the value (37) read from the valid (V) bit 501 as well as for the value (16) in the field SZ (500) are not shielded. Furthermore, a static circuit is used to drive the value (37) of the valid bit 501 and the value (16) of the field SZ (500).

In the above case, the logic thresholds for the inverters 309 and 311 are set approximately to Vcc/2. The circuit for driving the value (16) of the field SZ (500) will be described later in more detail with reference to FIG. 9.

The static driving circuit is adopted for the following reason: the address translation time as a whole remains unaffected even if the value (37) of the valid (V) bit 501 and the value (16) of the field SZ (500) are not driven at a high speed by a dynamic circuit, as long as the two values are driven within the delay time of the hit lines 36 and 38.

With the above arrangements in place, the address translation time can be shortened while any increase in the area occupied by the way select signal generating circuit is minimized.

Figure 5:
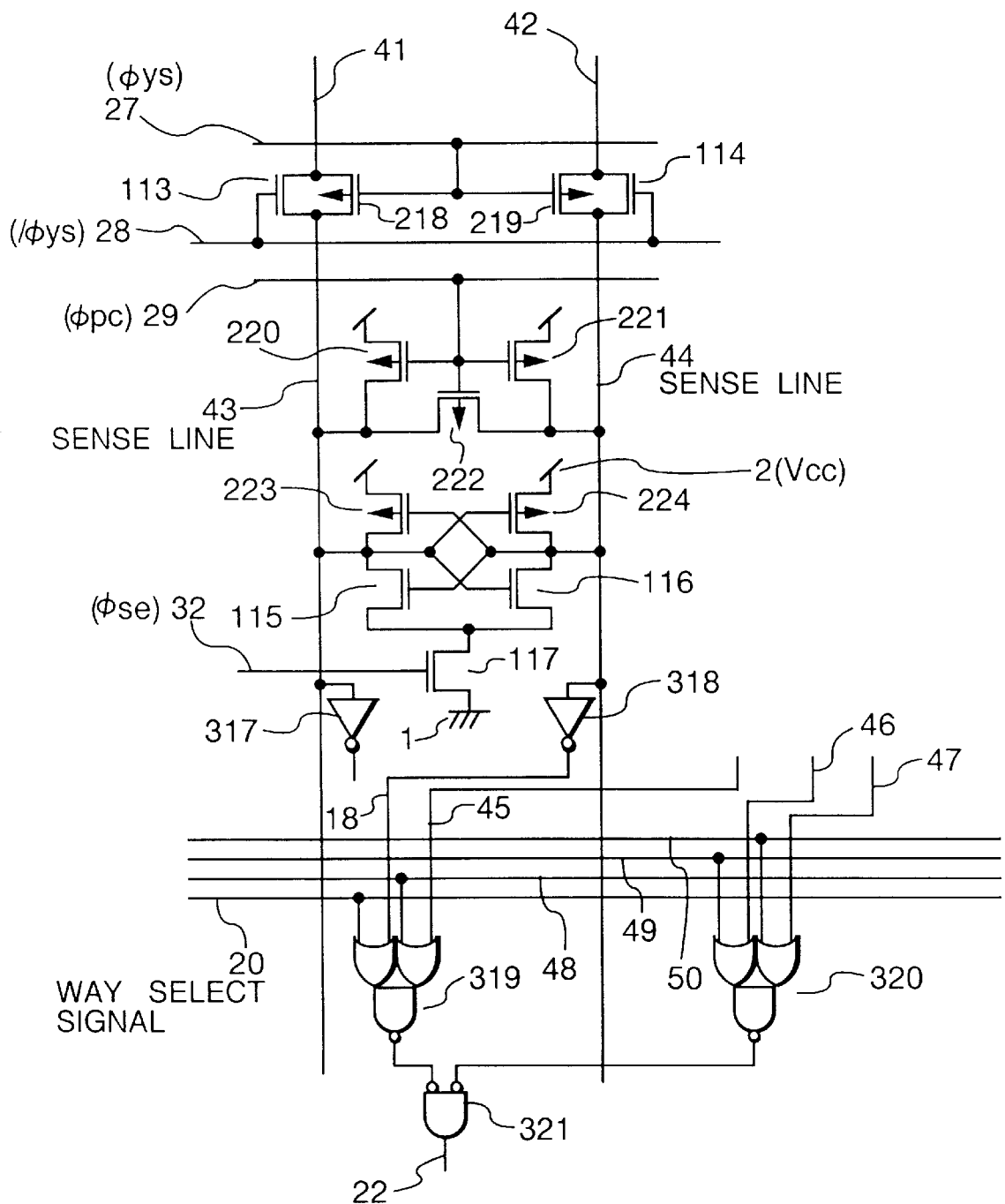
FIG. 5 is a circuit diagram showing a specific circuit constitution of a way selector circuit included in FIG. 1.
Figure 6:
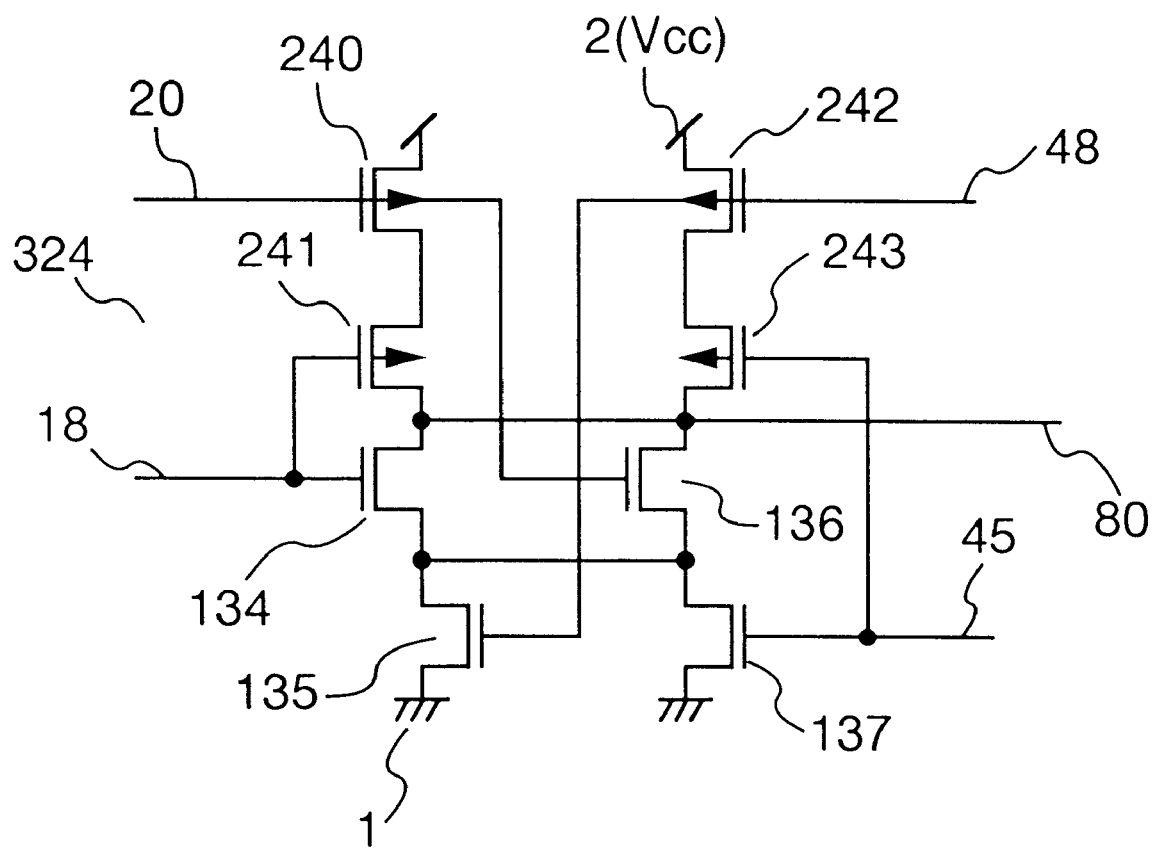
FIG. 6 is a circuit diagram of an OR-AND-NOT composite gate circuit shown in FIG. 5 and constituted by use of MOS transistors.
Figure 7A:
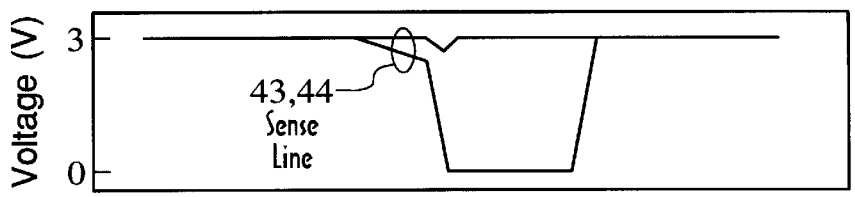
FIGS. 7A to 7H are views waveforms applicable when the way selector circuit of FIG. 5 is in operation.
Figure 7B:
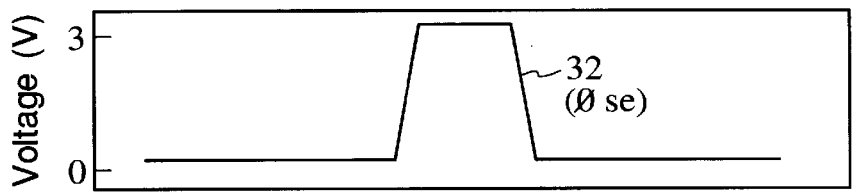
Figure 7C:
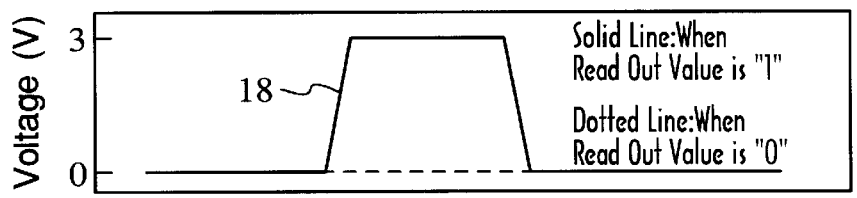
Figure 7D:
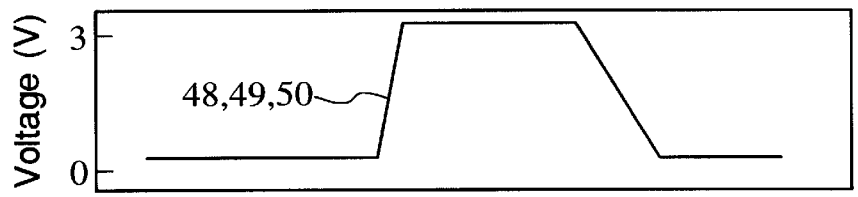
Figure 7E:
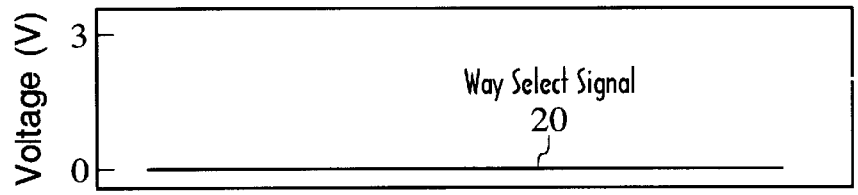
Figure 7F:
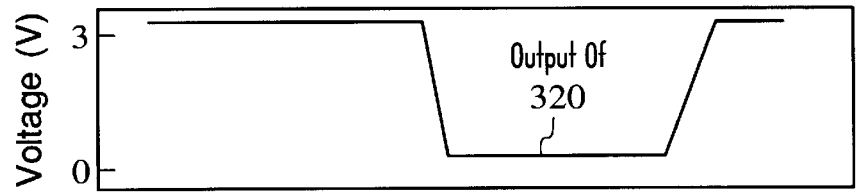
Figure 7G:
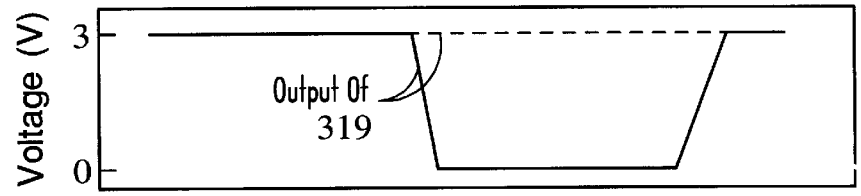
Figure 7H:
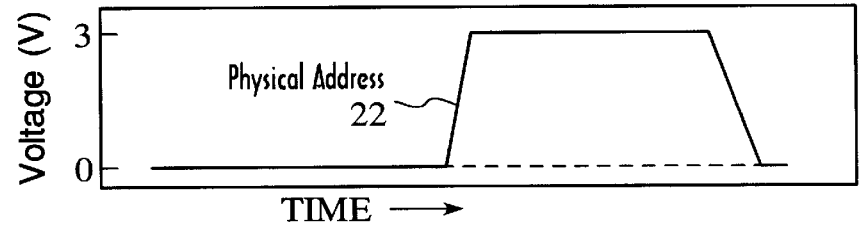

FIGS. 5 and 6 are circuit diagrams showing specific details of the way selector circuit 405 as it is constituted in the first embodiment. FIGS. 7A to 7H are views of waveforms applicable when the way selector circuit 485 is in operation.

OR-AND-NOT composite gate circuits 319 and 320 and a NOR circuit 321, depicted in FIG. 5, make up the way selector circuit 405. The way selector circuit 405 is already shown in FIG. 1.

FIG. 6 is a circuit diagram of one of the OR-AND-NOT composite gate circuits 319 and 320 shown in FIG. 5 and constituted by use of MOS transistors.

In this example, four ways are provided for each bit. Because the way selector circuit 405 in FIG. 5 is a circuit arranged for one bit, a single way selector circuit is furnished to every four columns of the memory cell arrays making up the data arrays.

FIG. 5 simply shows a column circuit representing a single column of the memory cell arrays, and a way selector circuit 405 corresponding to four ways.

The 4 : 1 way selector circuit 405 (multiplexer) is required to keep its output from entering the high-impedance state or to prevent a steady-state current from flowing therethrough even when all four control signals reach the same state. This requirement is met by the way selector circuit 405 adopting composite gate circuits.

With the first embodiments as depicted in FIG. 5, the 4 : 1 way selector circuit 405 is implemented by combining two OR-AND-NOT composite gate circuits 319 and 320 (in FIG. 6) with the two-input NOR circuit 321.

The data input of the OR-AND-NOT composite gate circuit 319 receives that signal of a sense line 44 which is inverted by an inverter 318.

A sense line 43 and the sense line 44 are pre-charged with the High potential before an address compare operation is started. At the same time, all four way select signals 20, 48, 49 and 50 are held Low. Thus the outputs of the OR-AND-NOT composite gate circuits 319 and 320 are all High prior to the address compare operation.

The sense line 43 not admitted to any input of the OR-AND-NOT composite gate circuits 319 and 320 is also provided with an inverter circuit (with its output open). This arrangement is intended to balance the two sense lines 43 and 44 in terms of capacity.

How the way selector circuit 405 of FIG. 5 works will now be described with reference to the performance waveforms illustrated in FIGS. 7A to 7H.

The way select signals 20, 48, 49 and 50 shown in FIG. 5 are each comparable to the way select signal indicated in FIG. 4. They are used to select the ways that correspond to them.

The circuit arrangements other than those associated with the way select signals 20, 48, 49 and 50 and the way selector circuit shown in FIG. 5 are the same as those of the address arrays 402 depicted in FIG. 2. The detailed timings and pre-charge conditions of such circuit arrangements will not be described further.

With the way selector circuit 405 of FIG. 5 in a wait state (i.e., pre-charged state), the output of the inverter 318 is Low, Other signals 45, 46 and 47 corresponding to the outputs of the inverters 318 for the other columns are also Low.

In this state, the sense amplifier composed of the MOS transistors 208, 209, 104, 105 and 106 is started. Before one of the sense line pair 43 and 44 is brought Low, the way select signals 20, 48, 49 and 50 are pre-charged to indicate all ways being in the hit state (Low), as explained in connection with the circuit of FIG. 4.

The outputs of the OR-AND-NOT composite gate circuits 319 and 320 are High. This is because the way select signals 20 and 48 shown in FIG. 6 are both Low.

As a result, the two inputs to the NOR circuit 321 are both High. The output of the NOR circuit 321 is thus brought Low.

When the read operation is started and the sense amplifier is operated, one of the sense lines 43 and 44 develops ground potential (0 V). This causes the output of either the inverter 317 or inverter 318 to be driven High.

In the way selector circuit 405 of FIG. 5, the sense line 44 is brought Low when the read-out value is 1. The output of the inverter 318 changes from the Low to the High states as indicated in solid lines in FIG. 7.

When the way select signal 20 is Low and the way select signals 48, 49 and 50 are High, i.e., when the way designated by the way select signal 20 has a hit, the OR-AND-NOT composite gate circuit 319 effects the Low output.

The output of the OR-AND-NOT composite gate circuit 320 is driven Low. This is because the way select signals 49 and 50 are both High.

The two inputs of the NOR circuit 321 receive two Low signals: the Low output of the OR-AND-NOT composite gate circuit 319, and the Low output of the OR-AND-NOT composite gate circuit 320. Thus the one-bit physical address 22 is driven High.

If the read-out value is 0, the sense line 44 stays pre-charged with the potential of Vcc. The sense line 44 thus remains in the High state.

As a result, the output of the inverter 318 remains Low. The OR-AND-NOT composite gate circuit 319 keeps outputting the High signal.

At this points suppose that the way select signal 20 is Low and that the way select signals 48, 49 and 50 are High, i.e., that the way designated by the way select signal 20 has a hit. In that case, the OR-AND-NOT composite gate circuit 319 outputs the High signal.

Here, the OR-AND-NOT composite gate circuit 320 is outputting the Low signal as described above. The two inputs of the NOR circuit 321 thus receive the High and Low signals. This drives the one-bit physical address 22 Low.

In the manner described, the way selector circuit 405 in FIG. 5 works as a four-input, one-output selector circuit.

After the read-out data of the data arrays 403 is selected by the way select signal, a wait state is restored in preparation for the next cycle. This process is the same as that of the circuits in FIGS. 2 and 4.

In addition, the way selector circuit 405 depicted in FIG. 5 adopts the following arrangements to enhance the operating speed:

With the first embodiment, the way select signal changes only from Low to High. The output 18 of the inverter 318 also changes from Low to High only.

With such characteristics taken into account, the gate width of the NMOS transistors is designed to be greater than that of the PMOS transistors in the OR-AND-NOT composite gate circuits 319 and 329. The logical thresholds for such components are set to be lower than Vcc/2. These arrangements shorten the fall time of the outputs of the OR-AND-NOT composite gate circuits 319 and 320.

Furthermore, the outputs of the OR-AND-NOT composite gate circuits 319 and 329 change only form High to Low. Thus the output of a NOR circuit 21 changes from Low to High only.

In that case, the gate width of the PMOS transistors is designed to be greater than that of the NMOS transistors in the NOR circuit 21. The logic thresholds for these components are set to be higher than Vcc/2. Such arrangements shorten the rise time of the output of the NOR circuit 21.

With the above arrangements in place, it is possible to shorten the delay time (forward delay time) that elapses when the output 18 of the inverter 318, held Low with the sense lines 43 and 44 pre-charged, changes from the Low to the High state while a 1 is being read from the memory cell.

In the case above, the outputs of the OR-AND-NOT composite gate circuits 319 and 320 remain High because the hit lines 36 and 38 (FIG. 4), the input gate of the two-input AND circuit 314 (FIG. 4) and the sense lines 43 and 44 are all pre-charged before the address compare operation is started. When the way select signals and the output 18 of the inverter 318 change, the composite gate circuit outputs change from High to Low alone.

Because only the forward delay time affects the address translation time, the address translation time is shortened without any increase in the cycle time if the way select signal is placed in the hit state (Low), with the output 18 of the inverter 318 driven Low and with the output of the two-input NAND circuit 314 also brought Low within the operation cycle time.

Figure 8:
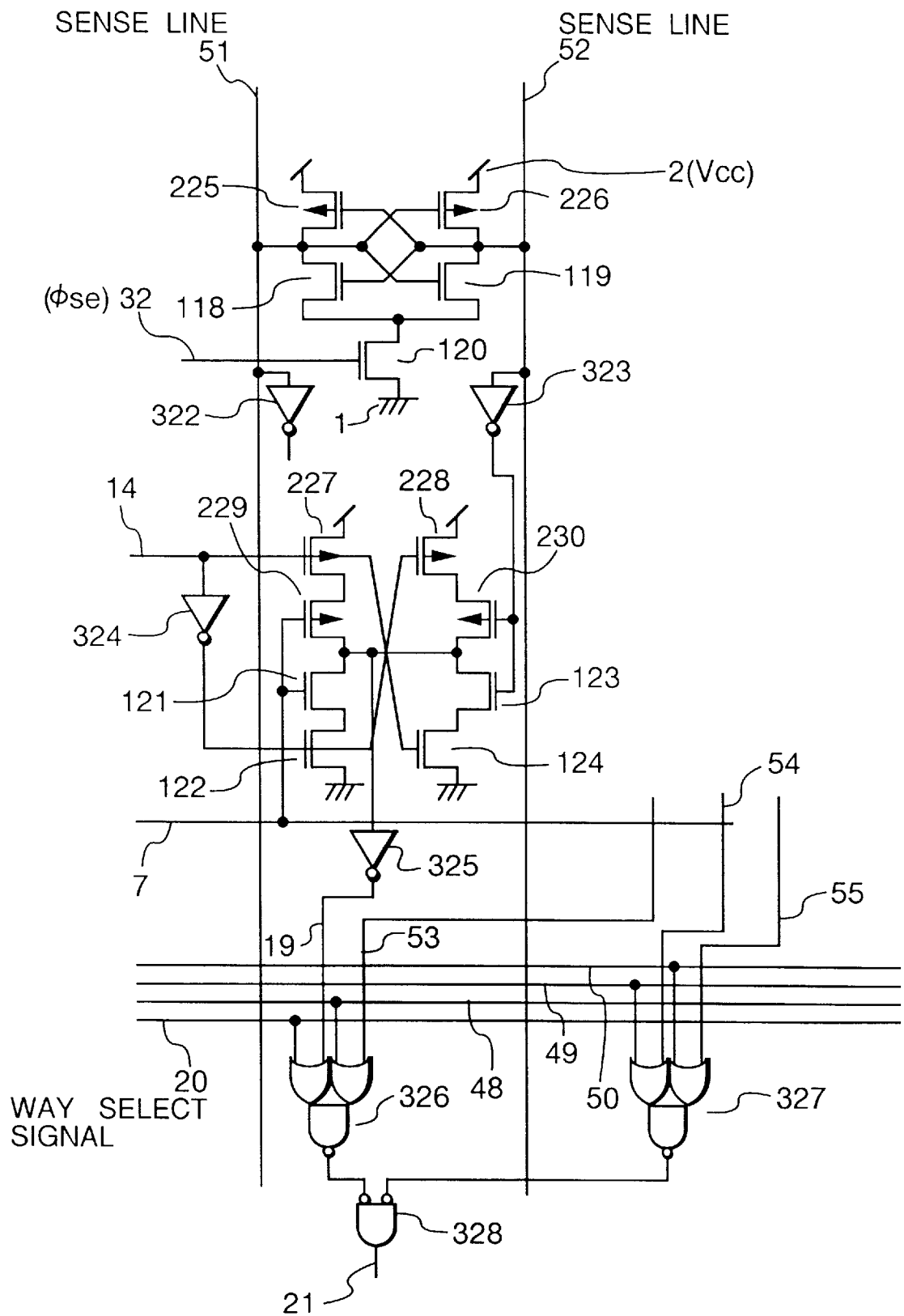
FIG. 8 is a circuit diagram of a selector circuit shown in FIG. 1.

FIG. 8 is a circuit diagram of the selector circuit 406 shown in FIG. 1. The selector circuit 406 in FIG. 1 selects one of two alternative outputs according to the bit value of the field SZ (500) indicating a variable page size. That is, either bits 11 and 10 ([11 : 10]) 17 read from the field 503 of the data arrays 403 are output as the physical address, or bits 11 and 10 (VA [11 : 10]) 7 in the virtual address 505 are output unmodified.

The page size condition is determined by the value of the field SZ (500) in the address arrays 402 shown in FIG. 1. When the value read from the field SZ (500) is 1, the page size is 4KB. In this case, bits 11 and 10 (VA [11 : 10]) in the virtual address 505 become an offset. Thus bits 11 and 10 (VA [11 : 10]) in the virtual address 505 are output unmodified as bits 11 and 10 ([11 : 10]) 21 of the physical address.

When the value of the field SZ (500) is 0, the page size is 1KB. In this case, bits 11 and 10 (VA [11 : 10]) in the virtual address 505 become a virtual page number. Thus bits 11 and 10 (17) read from the field 503 ([11 : 10]) in the data arrays 403 are output as bits 11 and 10 ([11 : 10]) 21 of the physical address.

The selector circuit 406 depicted in FIG. 8 is disposed upstream of the way selector circuit 405 shown in FIGS. 5 and 6 so as to shorten the address translation time. That is, the way selector circuit 405 selects the output of the selector circuit 406.

The selector circuit 406 receives as its inputs bits 11 and 10 (VA [11 : 10]) in the virtual address 505 and the output from an inverter 323 connected to the sense lines 43 and 44.

The selector circuit 406 selects one of two alternative outputs in accordance with a control signal 14 determined by the value from the field SZ (500) in the address arrays 402. That is, either bits 11 and 10 (VA [11 : 10]) 7 in the virtual address 505, or bits 11 and 10 (17) read from the field ([11 : 10]) 503 in the data arrays 403 are selected. The selected bits are forwarded to the way selector circuit 405.

How the selector circuit 406 of FIG. 8 operates will now be described.

The circuit arrangements in FIG. 8 other than the selector circuit 406 composed of PMOS transistors 227, 228, 229 and 230, of NMOS transistors 121, 122, 123 and 124, and of inverters 324 and 325 are the same as those of the way selector circuit 405 in FIG. 5.

The timing details and pre-charge conditions of such circuit arrangements were already discussed in connection with the comparator shown in FIG. 2, and will not be described further.

When the read operation is started, one of sense lines 51 and 52 pre-charged and held High goes into the Low potential state. One of the outputs of inverters 322 and 323 connected to the sense lines 51 and 52 changes from Low to High.

One of the outputs of the inverters 322 and 323 connected to the sense lines 51 and 52 is fed to the input of the selector circuit 406. The other inverter is provided to balance the sense lines 51 and 52 in terms of capacity, as explained in connection with the way selector circuit 405 in FIG. 5.

In the selector circuit 406 of the TLB in FIG. 1, when the control signal 11 is brought Low, the selector control signal 14 goes High regardless of the value in the field SZ (500) indicating the page size.

Using the selector control signal 14, the selector circuit 406 selects the output of the inverter 323. The selected output is input to OR-AND-NOT composite gate circuits 326 and 327 in the way selector circuit 405.

When the control signal 11 is High, either bits 11 and 10 (17) read from the field ([11 : 10]) in the data arrays 403, or bits 11 and 10 (VA [11 : 10]) 7 in the virtual address 505 are input to the OR-AND-NOT composite gate circuits 326 and 327. Thereafter, the bits are output as bits 11 and 10 (21) of the physical address.

As described, if the control signal 11 is High and the value read from the field SZ (500) is Low, then the page size is 1KB and the selector control signal 14 is High. In that case, the selector circuit 406 selects bits 11 and 10 (17) read from the field ([11 : 10]) 503 in the data arrays 504, and inputs the selected bits to the OR-AND-NOT composite gate circuits 326 and 327.

If the control signal 11 is High and the value read from the field SZ (500) is also Highs then the page size is 4KB and the selector control signal 14 is Low. In that case, the selector circuit 406 selects bits 11 and 10 (VA [11 : 10]) 7 in the virtual address 505, and inputs the selected bits to the OR-AND-NOT composite gate circuits 326 and 327.

In the manner described, the way selector circuit 405 outputs as the physical address 21 the value of the way for which the way select signal is driven Low (i.e., hit state).

As discussed above, the page size is made variable by two provisions: by the field 503 constituting either an offset or a page number of the data arrays 403 following each page size changes and by the selector circuit 406 disposed upstream of the way selector circuit 405 and designed to output as the physical address either the virtual address 505 or the page number depending on the value of the field SZ (500) indicating the page size.

Figure 9:
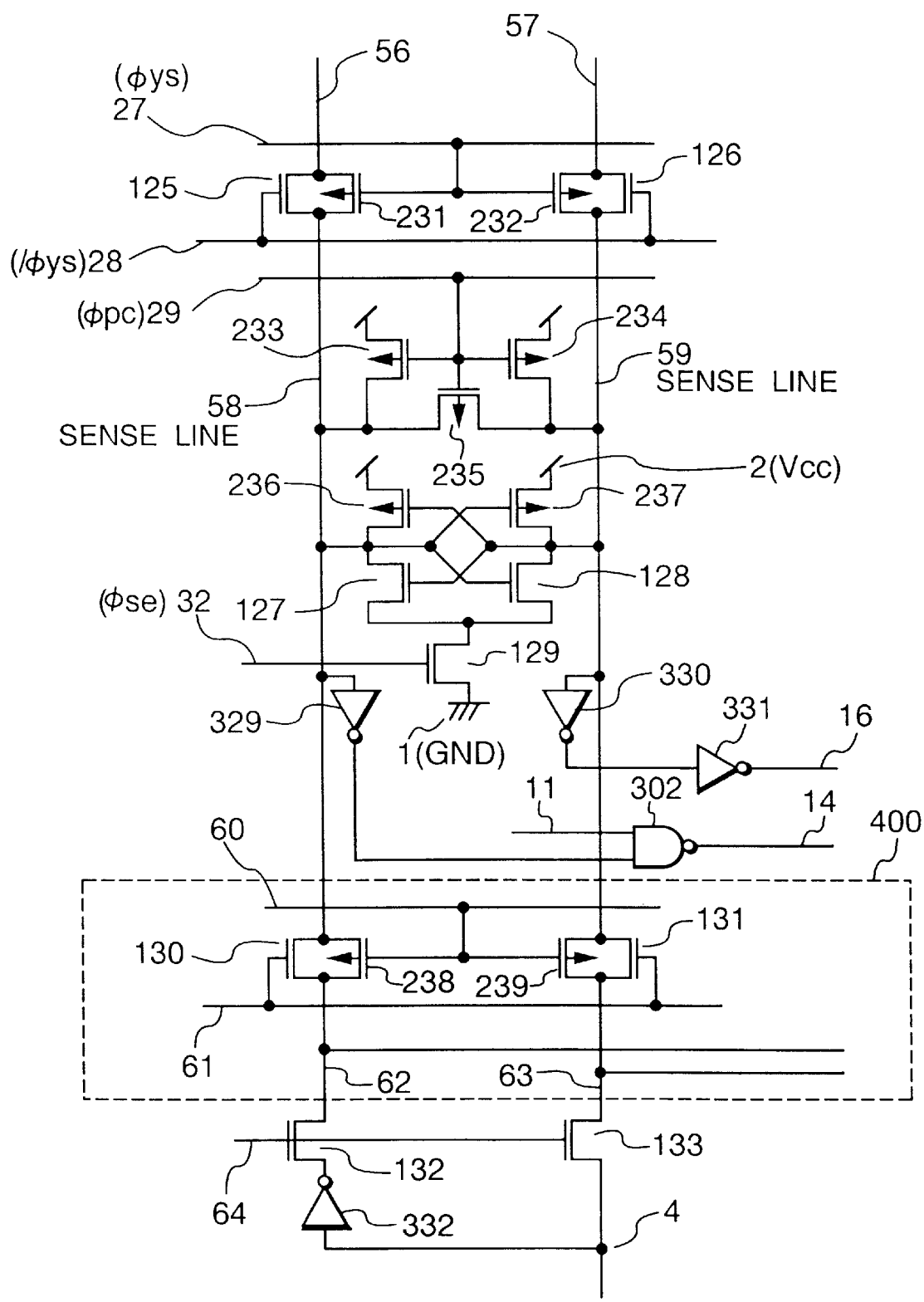
FIG. 9 is a circuit diagram of a read and write circuit for writing and reading a page size to and from a field SZ shown in FIG. 1.

FIG. 9 is a circuit diagram of a read and write circuit for writing and reading a page size to and from the field SZ (500) shown in FIG. 1. A two-input NAND circuit 302 included in FIG. 9 is one of the NAND circuits 302 indicated in FIG. 1. This is a circuit that generates the selector control signal 14.

What follows is a description of the workings of the read and write circuit for writing and reading data to and from the field SZ (500) accommodating the page size (see FIG. 9).

In the same manner as discussed above in connection with the circuits in FIGS. 2, 5 and 8, data lines 56 and 57 and sense lines 58 and 59 are pre-charged with the potential Vcc by a pre-charge circuit (comprising PMOS transistors 233, 234 and 235).

When a read operation is started, one of the sense lines 58 and 59 pre-charged and held High enters the Low potential state. This causes the outputs of inverters 329 and 330, connected to the sense lines 58 and 59, to change from Low to High.

One of the outputs of the inverters 329 and 330 connected to the sense lines 58 and 59 reaches one input of the two-input NAND circuit 302 generating the selector control signal 14. The other inverter output becomes the value 16 of the field SZ (500), to be input to the way select signal generating circuit shown in FIG. 4.

The selector control signal 14 is brought Low when the value read from the field SZ (500) is High (with the sense line 58 in the Low potential state) and when the control signal 11 is High. Otherwise the selector control signal 14 is driven High.

A circuit 400, enclosed by broken lines in FIG. 9, is an addressing way selector circuit.

For a data write operation, an addressing way select signal 60 (61) is driven Low (High) and a write enable signal 64 is brought High. This allows write data 4 to be written to the memory cell, not shown in FIG. 9, of which the word line is selected.

As discussed above, each entry has a bit that retains the page size. This allows the set-associative TLB to store address translation pairs of different page sizes for each of the entries provided.

In order to speed up the operation of the selector circuit 406 in FIG. 8, the first embodiment controls write data for the data arrays 403 in the manner described in FIG. 10.

Read operations are made faster by implementing the selector circuit 406 of FIG. 8 as a dynamic circuit in which the logic thresholds of the components are shifted in a suitable manner.

However, when bits 11 and 10 of the field ([11 : 10]) 503 in the data arrays 403 are read as shown in FIG. 8, the way selector circuit 405 can operate in the backward direction depending on the values of the bits 11-10 thus read out. This can prolong the address translation time. The backward operation means that the output 21 of the NOR circuit 328 changes from High to Low.

Thus when the page size is 1KB, the write data 5 of bits 11-10 in the data arrays 403 are written unmodified to the field ([11 : 10]) 503 of the data arrays 403. When the page size is 4KB, the data write operation is controlled so that the output of the physical address will remain unchanged until the control signal 14 of the selector circuit 406 is established.

That is, the value written to the field ([11 : 10]) 503 in the data arrays 403 is to be such a value that will keep unchanged the input signal of the way selector circuit 405 in a wait state (i.e., pre-charged state) even after the read operation is started.

In the case of the selector circuit 406 in FIG. 8, the data written to the field ([11 : 10)) 503 in the data arrays 403 is controlled to be a value that drives the input signal of the way selector circuit 405 Low.

Controlling suitably the write data directed to the field ([11 : 10]) 503 in the data arrays 403 forestalls the backward operation. This prevents an increase in the address translation time.

The operation of the selector circuit 406 in FIG. 8 is determined by the value of the field SZ (500) in the address arrays. The input signal to the way selector circuit 405 is selected from two alternatives: either bits 11 and 10 (VA[11 : 10]) 7 in the virtual address 505, or bits 11 and 10 (17) read from the field ([11 : 10]) 503 of the data arrays 403.

The way selector circuit 405 is structured as a dynamic circuit. The dynamic circuit structure contributes to shortening the time it takes to read data from the data arrays 403.

It should be noted that the way selector circuit 405, being a dynamic circuit, can operate in the backward direction when the page size is 4KB. The workings of the selector circuit 406 and those of the way selector circuit 405 in such a case will now be described with reference to FIGS. 12A to 12K.

FIGS. 12A to 12K are views of waveforms applicable when the selector circuit 406 of FIG. 8 is in operation and the control method of FIG. 10 is in effect. The timing details and pre-charge conditions of the circuit arrangements involved were already discussed in connection with the comparator shown in FIG. 2, and will not be described further with reference to FIGS. 12A to 12K.

Before a read operation is started, the sense line pair 58 and 59 are pre-charged. Thus the selector control signal 14 is High regardless of the state of the control signal 11.

In the selector circuit 406, the PMOS transistor 228 and NMOS transistor 124 are turned on. Bits 11 and 10 read from the field ([11 : 10]) 503 in the data arrays 403 are input to the OR-AND-NOT composite gate circuit 326 of the way selector circuit 405. This drives Low the input signal to the way selector circuit 405.

When the read operation is started, the outputs of the inverters 322, 323, 329 and 330 are inverted depending on the bit read-out.

As described in connection with the way select signal generating circuit in FIG. 4, the way select signals 20, 48, 49 and 50 are all placed in the hit state (i.e., Low) by a pre-charge operation.

At this point, the physical address is constituted by bits 11 and 10 read from the field ([11 : 10]) 503 in the data arrays 403.

When the bit read-out from the field ([11 : 10]) in the data arrays 403 turns out to be 1, the potential on the sense line 52 drops. This changes the output of the inverter 322 from Low to High.

The selector circuit 406 keeps selecting the signal of the sense line 52 until the selector control signal 14 is established following the change from the High to the Low state. During that period, the High signal is input to the OR-AND-NOT composite gate circuit 326.

If the bit read-out from the field ([11 : 10]) 503 in the data arrays 403 turns out to be 1 for all ways, the output of the way selector circuit 405 changes before the way select signals 20, 48, 49 and 50 are established. The physical address thus leaves the wait state (Low).

When two inputs 18 and 45 of the OR-AND-NOT composite gate circuit in FIG. 6 receive the High signal, the composite gate circuit outputs the Low signal regardless of what the other inputs 20 and 48 admit.

Thus if the bit read-out from the field ([11 : 10]) 503 in the data arrays 403 turns out to be 1 for all ways, the outputs of the OR-AND-NOT composite gate circuits 326 and 327 are both Low, and the Low signal is input to the NOR circuit 328. This drives the physical address 21 High.

Thereafter, with the selector control signal 14 established and held Low, the PMOS transistor 227 and NMOS transistor 122 in FIG. 8 are turned on. This causes the selector circuit 406 to select bits 11 and 10 (VA [11 : 10]) in the virtual address 505, and to input the selected bits to the OR-AND-NOT composite gate circuit 326.

At this points if bits 11 and 10 (VA [11 : 10]) 7 in the virtual address 505 turn out to be 0, the output of the OR-AND-NOT composite gate circuit 326 is driven High. The High and Low signals are input to the NOR circuit 328, and the output 21 is inverted to the Low state.

Such signal changes derive from the fact that when the way selector circuit 405 acts as a dynamic circuit and when the signals on the sense lines 58 and 59 make up values that cause the way selector circuit 405 to operate in the forward direction (i.e., whereby the physical address changes from the Low to the High state), the way selector circuit 405 operates inadvertently, prompted by those changes on the sense lines 58 and 59 which take place before the selector control signal 14 is established.

That is, the way selector circuit 405 operates in the backward direction (i.e., whereby the physical address changes from the High to the Low state). This delays establishment of the physical address.

With the first embodiment, the backward operation of the dynamic circuit above is prevented by the arrangement described in connection with the write control method shown in FIG. 10. That is, when the value of the field SZ (500) indicating the page size is 1, suitable data is written beforehand to the field ((11 : 10]) 503 in the data arrays 403 so that the Low signal will be input to the OR-AND-NOT composite gate circuits 326 and 327.

The arrangement above keeps the input signal of the way selector circuit 405 from inadvertently leaving the wait state. This allows bits 11 and 10 (VA [11 : 10]) in the virtual address 505 to be selected.

As described, any increase in the address translation time is prevented by suitably controlling the value written to that field ([11 : 10]) 503 in the data arrays 403 which designates either an offset or a page number depending on the page size in effect. The value written to the field 503 is controlled at the value of a predetermined logic function (i.e., NOR circuit 301 in FIG. 1) performed between externally input data array write data 5 and the data 4 to be written to the field SZ (500) indicating the page size.

Described below with reference to the waveforms in FIGS. 12A to 12K are the workings of the column circuits in FIGS. 8 and 9 with respect to bits 11 and 10 in the data arrays 403 as well as to the field SZ (500).

Figure 12D:
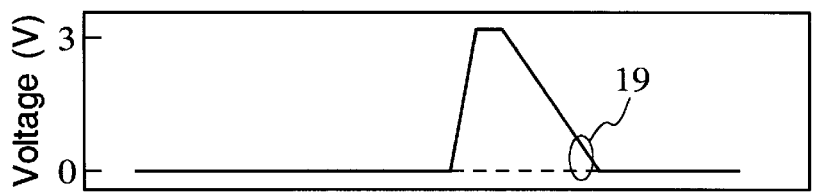
Figure 12E:
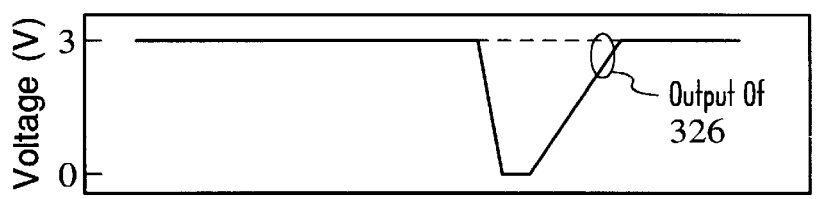
Figure 12F:
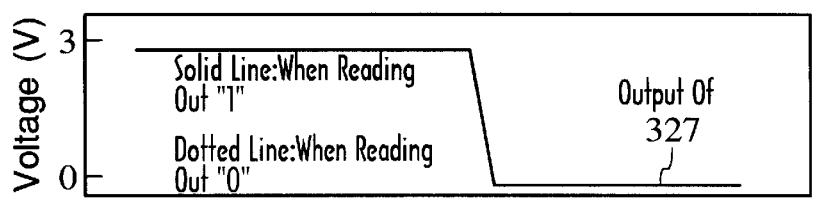
Figure 12G:
Figure 12H:
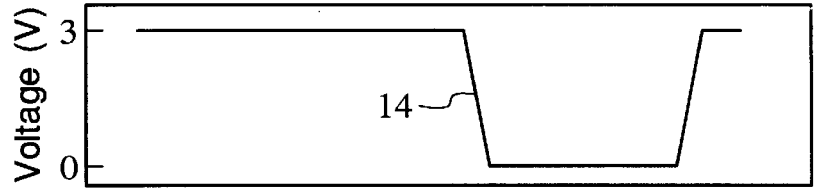
Figure 12I:
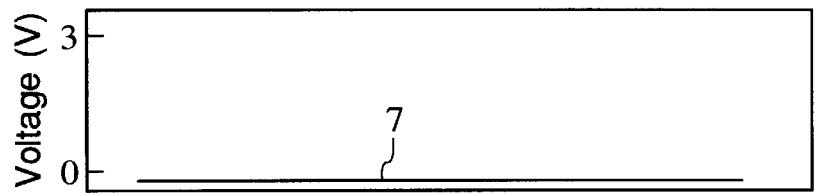
Figure 12J:
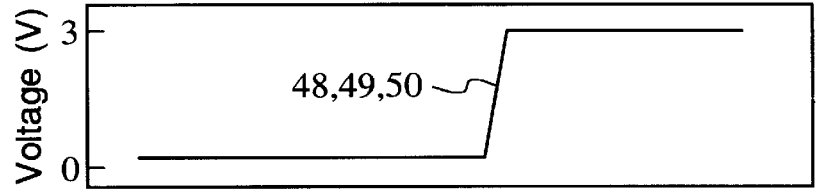
Figure 12K:
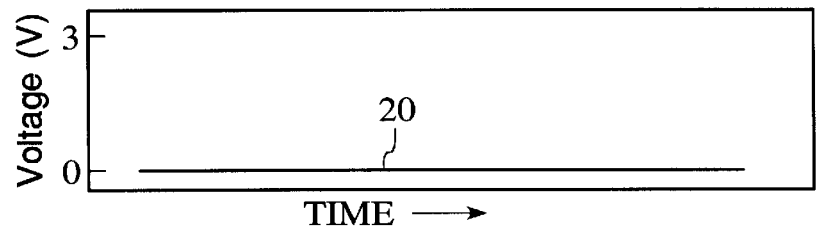

In the wait states the selector circuit 406 outputs the Low signal for all ways, as shown in solid lines (19, 53, 54, 55) in FIGS. 12C and 12D. At this point, the OR-AND-NOT composite gate circuits 326 and 327 output the High signals because the way select signals 20, 48, 49 and 50 are Low. This drives the physical address 21 Low.

Since the write control method of FIG. 10 is in effect, if there is a way for which the page size is set to 4KB, a value of 0 is written to the data array of that way. Thus even when the read operation is started, the outputs of the OR-AND-NOT composite gate circuits 326 and 327 including the way whose page size is 4KB remain unchanged.

In the case above, the value of 0 is written to the way corresponding to the way select signal 20, as indicated by the output 19 of the selector circuit 406, shown in dotted lines in FIG. 12D.

Even when one of the outputs of the OR-AND-NOT composite gate circuits 326 and 327 changes from High to Low, the physical address 21 remains unchanged unless the two inputs are driven Low together, as described.

Thereafter, the selector control signal 14 is brought Low, the way selector signals 48, 49 and 50 are driven High (i.e., miss), and the way select signal 20 is brought Low (i.e., hit). The selector circuit 406 selects bits 11 and 10 (VA [11 : 10]) 7 in the virtual address 505, and the way selector circuit 405 selects the output 19 of the selector circuit 406. This leaves the output of the way selector circuit 405 and the physical address unchanged, whereby a high-speed address translation is made possible.

As described, after the read operation is started and before the way select signal and the control signal 14 of the selector circuit 406 are established, the selector circuit 406 may output the Low signal at least for a single way. In that case, the outputs of the OR-AND-NOT composite gate circuits 326 and 327 receiving the Low signal are allowed to remain High. The output 21 of the physical address also stays Low in its wait state.

After the way select signal is established, the selector circuit 406 may output the High signal but the physical address 21 is still output at high speed. This is because the size of the component MOS transistors is designed beforehand (for forward operation) so as to minimize the delay time involved.

Thus with the write control method of FIG. 10 in effects when the page size is 4KB and when the selector circuit 406 selects bits 11 and 10 (VA [11 : 10]) in the virtual address 505, suitable data is written to the field ([11 : 10]) 503 in the data arrays 403 in such a manner that drives Low the input to the way selector circuit 405. This scheme prevents the address translation time from getting longer.

FIG. 11 is a view illustratively comparing address translation times between two cases. One case involves having data suitably controlled before it is written to the bit positions that constitute either an offset or a page number depending on the page size in effect. The other case is one in which such data is not controlled before being written to the bit positions in question.

Comparisons are made in FIG. 11 on the assumption that the page size field SZ (500) contains 1 (i.e., the page size is 4KB) and that the read-out data from the field 503 in the data arrays 403 is 1 for all ways.

The comparisons indicate savings of up to 25% in the address translation time for the inventive setup where the write data is controlled by the write control method of FIG. 10, compared with the prior art case in which the backward operation is allowed to occur.

Second Embodiment

The second embodiment of the invention is an embodiment that outputs a way select signal whose phase is opposite to that of the way select signal indicated in FIG. 4.

Figure 13:
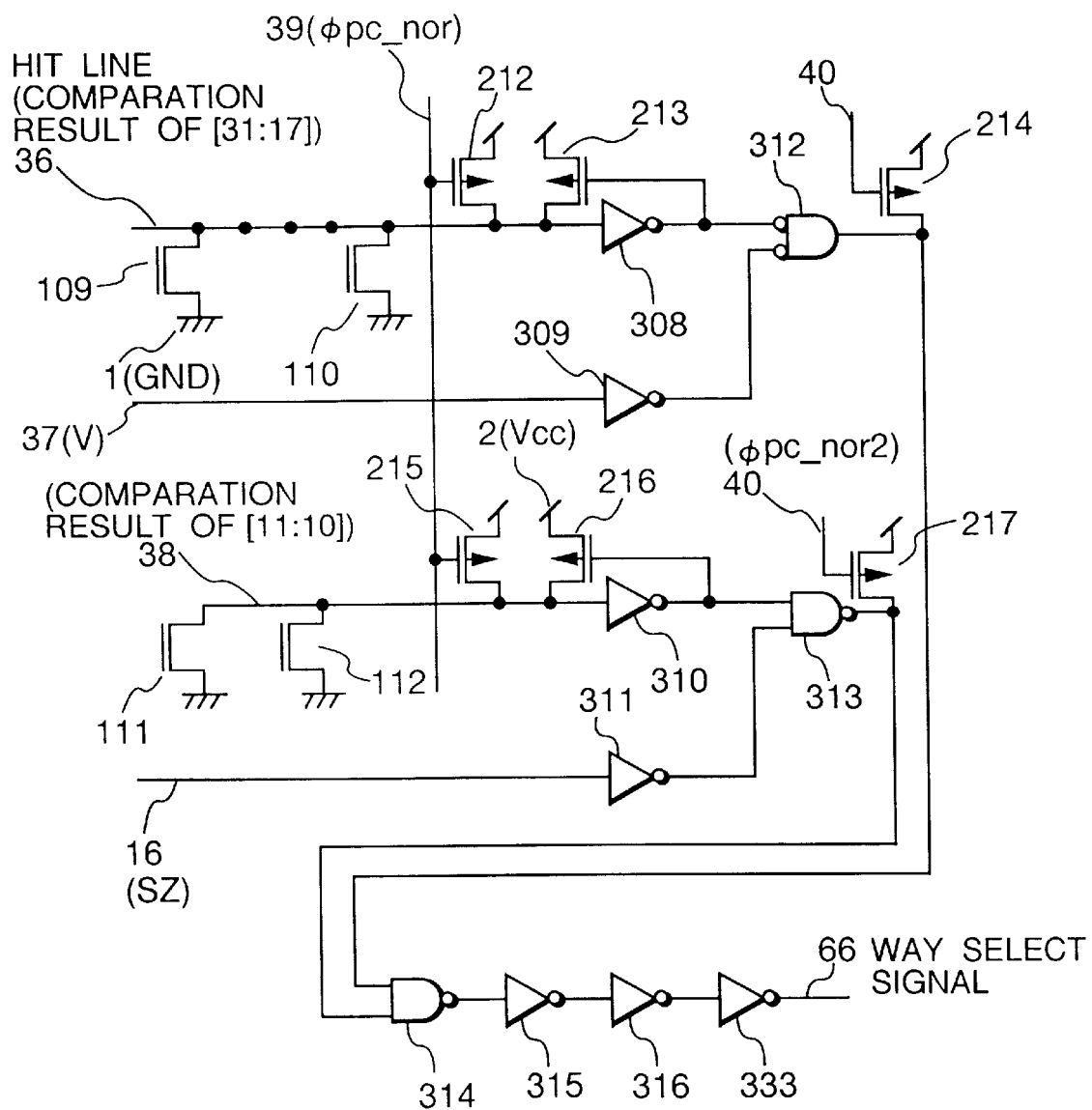
FIG. 13 is a circuit diagram of a way select signal generating circuit in a page size variable set-associative TLB practiced as a second embodiment of the invention.

FIG. 13 is a circuit diagram of a way select signal generating circuit in the page size variable set-associative TLB practiced as the second embodiment of the invention. The way select signal generating circuit of FIG. 13 outputs a way select signal that is opposite in phase to the way select signal indicated in FIG. 4.

In FIG. 13, the way select signal generating circuit generates its way select signal based on the outcome of the comparison between the tag field (VPN [31 : 17], VPN [11 : 10]) 15 read from the address arrays 402 on the one hand, and the tag field (VA [31 : 17], VA [11 : 10]) 9 in the virtual address 505 on the other. The compare operation is carried out by the comparator of FIG. 2.

The way select signal generating circuit in FIG. 13 and the comparator in FIG. 2 combine to work as one of the comparators 404 shown in FIG. 1.

The way select signal generating circuit of FIG. 13 differs from its counterpart of FIG. 4 in that the hit state of the way select signal is opposite in phase to the way select signal indicated in FIG. 4. The other circuit workings are the same as those of the way select signal generating circuit in FIG. 4.

The way select signal 66 and its comparable signals (the four-way setup of the TLB in FIG. 1 has four signals) are each placed into the hit state (High) by a pre-charge operation (Low in the setup of FIG. 4). If a hit way is recognized following the comparison between the tag field (VPN [31 : 17], VPN [11 : 10]) 15 read from the address arrays 402 on the one hand, and the tag field (VA [31 : 17], VA [11 : 10]) 9 in the virtual address 505 on the other, then the way select signal for the way that has a hit remains in its hit state (High), and the way select signals for the remaining ways are placed into the miss state (Low). If every way has a miss, then the way select signals for all ways are each placed into the miss state (Low).

The way select signals are used to control the way selector circuit 405, to select the read data from the data arrays 403, and to output the selected data as the physical address.

In the same manner as described in connection with the way select signal generating circuit of FIG. 4, selection of the read data from the data arrays 403 is followed by a pre-charge operation on the hit lines 36 and 38, on the output of the NOR circuit 312 and on the output of the NAND circuit 313.

Figure 14:
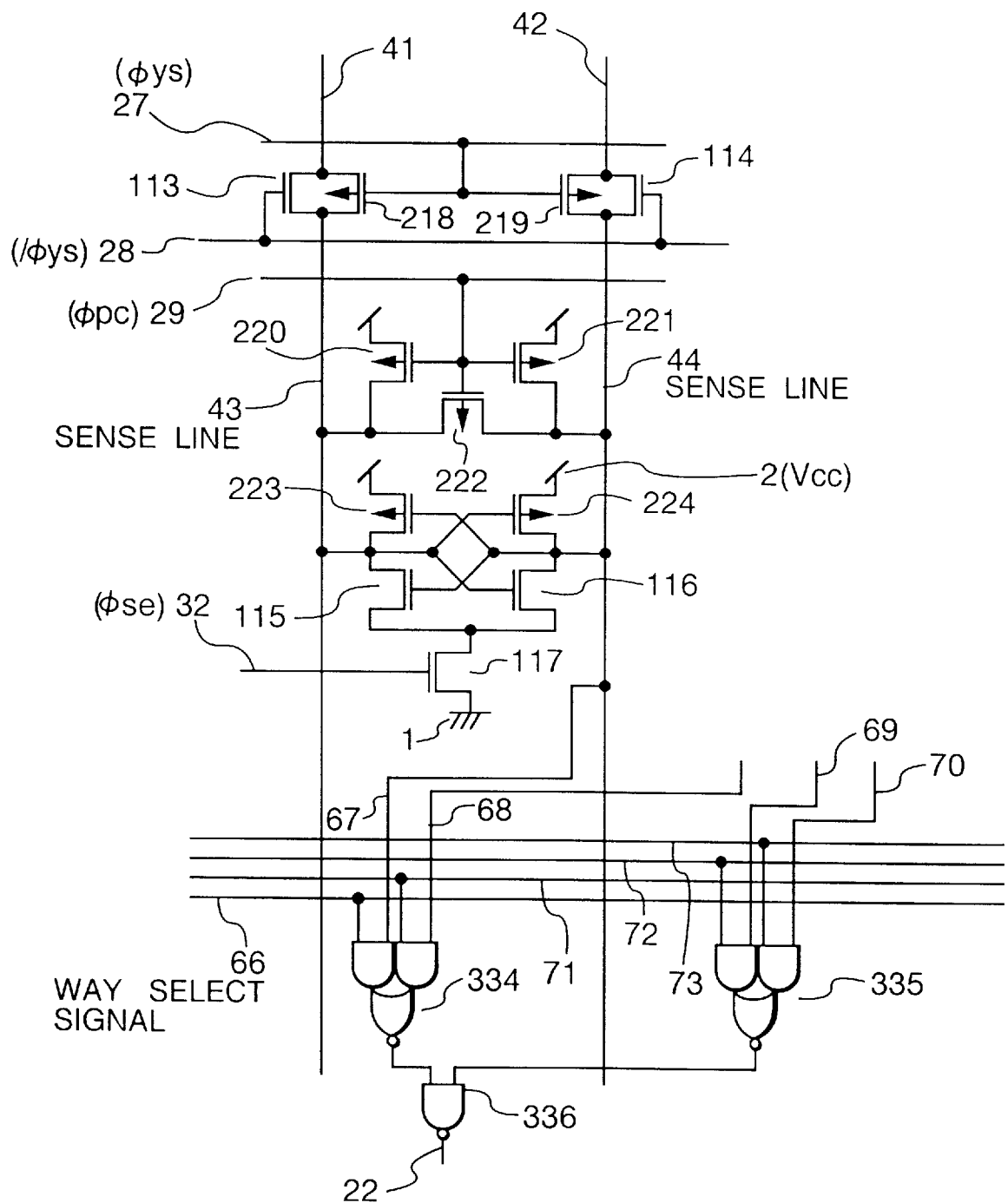
FIG. 14 is a circuit diagram of a way selector that is effective when the way select signal generating circuit of FIG. 13 is adopted.

FIG. 14 is a circuit diagram of the way selector that is effective when the way select signal generating circuit of FIG. 13 is adopted. In FIG. 14, the way selector 405 outputs the physical address of the way for which the tag field (VPN [31 : 17], VPN [11 : 10]) 15 read from the address arrays 402 has matched the tag field (VA [31 : 17], VA [11 : 10]) 9 in the virtual address 505.

AND-OR-NOT composite gate circuits 334 and 335 and a two-input NAND circuit 336 shown in FIG. 14 constitute the way selector 405 in FIG. 1.

Figures 15, 17:
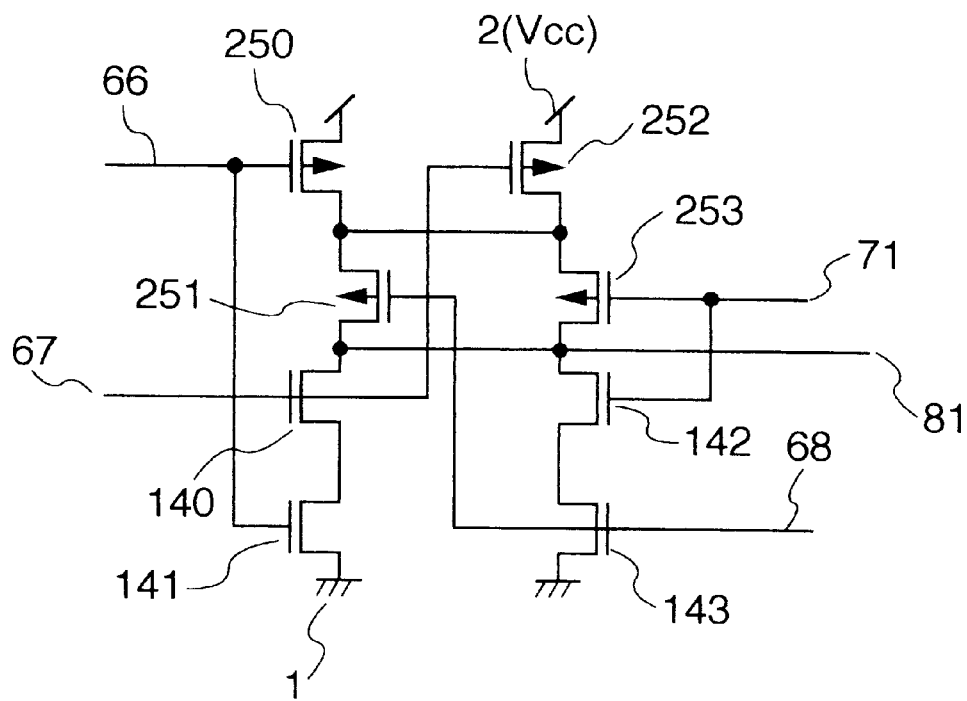
FIG. 15 is a circuit diagram of an AND-OR-NOT composite gate circuit shown in FIG. 14 and comprising NOS transistors.
FIG. 17 is a view explaining how the second embodiment controls write operations to the field SZ shown in FIG. 1 and indicating the page size.

FIG. 15 is a circuit diagram of one of the AND-OR-NOT composite gate circuits 334 and 335 shown in FIG. 14. The circuit of FIG. 15 is composed of MOS transistors.

The TLB in FIG. 1 has four ways arranged per bit. Thus the way selector circuit 405 in FIG. 14, being a one-bit selector circuit, is provided to every four columns of the memory cell arrays making up the data arrays 403. FIG. 14 illustrates only a column circuit for one column of the memory cell arrays and a selector circuit for four columns of the memory cell arrays.

What follows is a description of how the way selector circuit 405 of FIG. 14 operates.

In FIG. 14, the way selector signals 66, 71, 72 and 73 consist of the way select signal shown in FIG. 14 and of the other comparable way select signals for selecting the other ways.

The signal of the sense line 44 is input directly to the AND-OR-NOT composite gate circuit 334 in FIG. 14. The timing details and pre-charge conditions of the circuit are the same as those of the comparator shown in FIG. 2.

The circuit arrangements in FIG. 14 other than those associated with the way select signals 66, 71, 72 and 73 as well as the way selector circuit are the same as those of the column circuit with the exception of the comparator for the address arrays 402 in FIG. 2.

The sense lines 43 and 44 are pre-charged with the potential Vcc Thus when the sense amplifier made up of MOS transistors 115, 116, 117, 223 and 224 is operated, the way select signals 66, 71, 72 and 73 having been pre-charged designate the hit state each (i.e., High) until one of the sense line pair 43 and 44 is brought Low.

In the case above, the outputs of the AND-OR-NOT composite gate circuits 334 and 335 are all driven Low. The output 22 of the two-input NAND circuit 336 (i.e., physical address) is brought High.

When the sense amplifier is operated, one of the sense lines 43 and 44 is driven Low. When the read-out value is 1, the sense line 44 is brought High.

When the way select signal 66 is High and the way select signals 71, 72 and 73 are Low, the AND-OR-NOT composite gate circuit 334 outputs the Low signal With the way select signals 72 and 73 both held Low, the AND-OR-NOT composite gate circuit 335 outputs the High signal.

The two-input NAND circuit 336 admits the Low and High outputs from the AND-OR-NOT composite gate circuits 334 and 335. Thus the one-bit physical address 22 is driven High. When the read-out value is 0, the sense line 44 is brought Low.

When the way select signal 66 is High and the way select signals 71, 72 and 73 are Low, the AND-OR-NOT composite gate circuit 334 outputs the High signal. With the way select signals 72 and 73 both driven Low, the AND-OR-NOT composite gate circuit 335 outputs the High signal.

The two-input AND circuit 336 admits the High outputs from the AND-OR-NOT composite gate circuits 334 and 335. This causes the one-bit physical address 22 to be brought Low.

The way selector circuit 405 of FIG. 14 takes measures similar to those of the way selector circuit 405 of FIG. 5 in improving the operating speed. That is, the gate width of the PMOS transistors is designed to be greater than that of the NMOS transistors in the AND-OR-NOT composite gate circuits 334 and 335. The logic thresholds for these components are set to be higher than Vcc/2. Such arrangements shorten the rise time of the output signals from the AND-OR-NOT composite gate circuits 334 and 335.

Similarly, given the fact that the outputs of the AND-OR-NOT composite gate circuits 334 and 335 change only from Low to High, the gate width of the NMOS transistors is designed to be greater than that of the PROS transistors in the NAND circuit 336, and the logic thresholds for these components are set to be lower than Vcc/2. Such measures shorten the fall time of the output signal from the NAND circuit 336.

With the above arrangements in place, it is possible to shorten the delay time (in the forward direction) that elapses when the sense lines 43 and 44 pre-charged to be High changes to the Low state upon a read of 0 from the memory cell.

Figure 16:
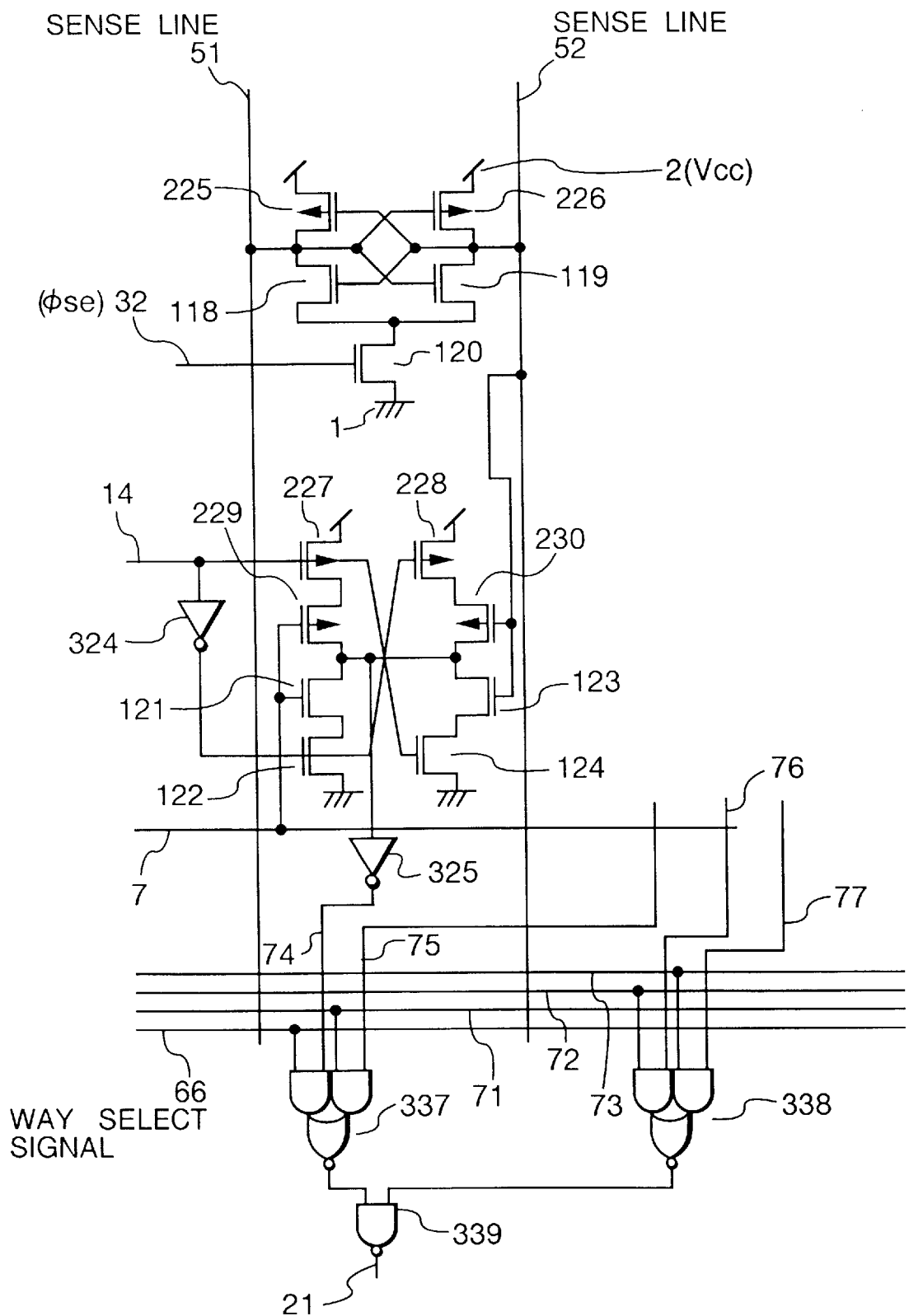
FIG. 16 is a circuit diagram of a way selector for use when the way select signal generating circuit of FIG. 13 is used.

FIG. 16 is a circuit diagram of the selector circuit 406 for use when the way select signal generating circuit of FIG. 13 is employed. The selector circuit 406 of FIG. 16 is disposed upstream of the way selector circuit 405 of FIG. 14. The output of the selector circuit 406 is selected by the way selector circuit 405.

The selector circuit 406 receives bits 11 and 10 (VA [11 : 10]) in the virtual address 505 and the signals on the sense lines 43 and 44 of the address arrays 402. Using the selector control signal 14 determined by the value from the field SZ (500) in FIG. 9, the selector circuit 406 selects one of two alternatives either bits 11 and 10 (17) read from the field ([11 : 10]) 503 of the data arrays 403, or bits 11 and 10 (VA [11 : 10]) 7 in the virtual address 505. The selected bits are output to the way selector circuit 405.

In FIG. 16, two AND-OR-NOT composite gate circuits 337 and 338 and a two-input NAND circuit 339 operate as the way selector circuit 405 shown in FIG. 1. From the selector output regarding the four ways, one way is selected by use of the way select signals 66, 71, 72 and 73. The result of the selection is output as the physical address 21.

When the selector circuit 406 in FIG. 16 selects either bits 11 and 10 (VA [11 : 10]) 7 in the virtual address 505, or bits 11 and 10 (17) read from the field ([11 : 10]) 503 of the data arrays 403, the conditions for the selection are the same as those of the selector circuit 405 in FIG. 8.

The way selector circuit 405, composed of the two AND-OR-NOT composite gate circuits 337 and 338 and of the two-input NAND circuit 339, outputs the physical address 21 that reflects the way values 74, 75, 76 and 77 in effect when one of the way select signals 66, 71, 72 and 73 enters the hit state (High).

As described, the page size is made variable by two provisions: by the field 503 constituting either an offset or a page number of the data arrays 403 following each page size change,, and by the selector circuit 406 disposed upstream of the way selector circuit 405 and designed to output as the physical address either the virtual address 505 or the page number depending on the value of the field SZ (500) indicating the page size.

In FIG. 16, the way selector circuit 405 is also structured as a dynamic circuit so as to shorten the time it takes to read data from the data arrays. The signal output by the selector circuit 405 is determined by the value from the field SZ (500) of the address arrays.

The selector circuit in FIG. 16, like its counterpart in FIG. 8, can operate in the backward direction when the page size is 4KB. This potential backward operations however, is prevented by suitably controlling the write data directed to the data arrays 403.

Before a read operation is started, the sense lines 51 and 52 are pre-charged to be High. Thus the selector control signal 14 is brought High regardless of the value of the control signal 11.

As a results the PMOS transistor 228 and NMOS transistor 134 are turned on in the selector circuit 406. The potential on the sense lines 43 and 44 for the data arrays 403 is selected and input to the AND-OR-NOT composite gate circuit 337 of the way selector circuit 405. This drives High the input signal to the way selector circuit 405.

Immediately after the read operation is started, all way select signals remain in the hit state (High) brought about by the pre-charge operation, as described. The selector control signal 14 also stays High. At this point, the physical address is composed of bits 11 and 10 read from the field ([11 : 10]) 503 of the data arrays 403.

When the bit value read from the field ([11 : 10]) 503 of the data arrays 403 is 0, the potential of the sense line 52 drops. The input of the selector circuit 406 changes from its wait state (High) to the Low state, and the Low signal is input to the AND-OR-NOT composite gate circuit 337.

If the value read from the field ([11 : 10]) of the data arrays 403 is 0 for all ways, the output of the way selector circuit 405 changes before the way select signals 66, 71, 72 and 73 are established. Thus the physical address leaves its Low state.

When the inputs 67 and 68 of the AND-OR-NOT composite gate circuit in FIG. 15 receive the Low signal, this AND-OR-NOT composite gate circuit outputs the High signal regardless of what is received by the other inputs 66 and 71.

This means that if the value read from every way is 0, the outputs of the AND-OR-NOT composite gate circuits 337 and 338 are both driven High. With the High signal input to the NAND circuit 339, the physical address 22 is brought Low.

Thereafter, suppose that where the page size is 4KB, a value of 1 is read from the field SZ (500) and that the control signal 14 of the selector circuit 406 is set to be Low. In such a case, the PMOS transistor 227 and NMOS transistor 122 are turned on.

This causes the selector circuit 406 to select bits 11 and 10 (VA [11 : 10]) in the virtual address 505. The selected bits are input to the AND-OR-NOT composite gate circuit 337.

If the value read from bits 11 and 10 (VA [11 : 10]) in the virtual address 505 is 1, the output of the AND-OR-NOT composite gate circuit 337 changes to the Low state. The NOR circuit 339 thus receives the Low and High signals, and the output 21 is inverted to the High state.

The inversion above takes place because the way selector circuit 405, which is a dynamic circuit, is liable to operate in the forward direction as discussed in connection with the circuits in FIGS. 8 and 9.

In FIG. 16, the backward operation of the dynamic circuit is prevented by writing a suitable value (i.e., 1) beforehand to the field ([11 : 10]) 503 (bits 11-10) of the data arrays 403 where the field SZ (500) indicating the page size is 1, as shown in FIG. 17. That value is controlled to be such that the inputs to the AND-OR-NOT composite gate circuits 337 and 338 are driven High.

Where the value of 1 is to be written beforehand to the field ([11 : 10]) 503 of the data arrays 403, the NOR circuit 301 in FIG. 1 need only be replaced by an OR circuit.

The arrangement above thus drives High the inputs to the AND-OR-NOT composite gate circuits 337 and 338 in the way selector circuit 405. When the page size is 4KB, the output physical address remains unchanged from the time the wait state is in effect until the selector control signal 14 is established.

As described, where the selector circuit 406 selects the offset value because the field SZ (500) has the value of 1 set therein beforehand, a suitable value is written to the field ([11 : 10]) 503 of the data arrays 403. That value is controlled to be such that drives the input to the way selector circuit 405 High. This minimizes the delay time involved and thereby forestalls any increase in the address translation time.

Third Embodiment

The third embodiment is an embodiment that prevents the way selector circuit 405 from operating in the backward direction in a manner different from the arrangements discussed so far.

Figure 18:
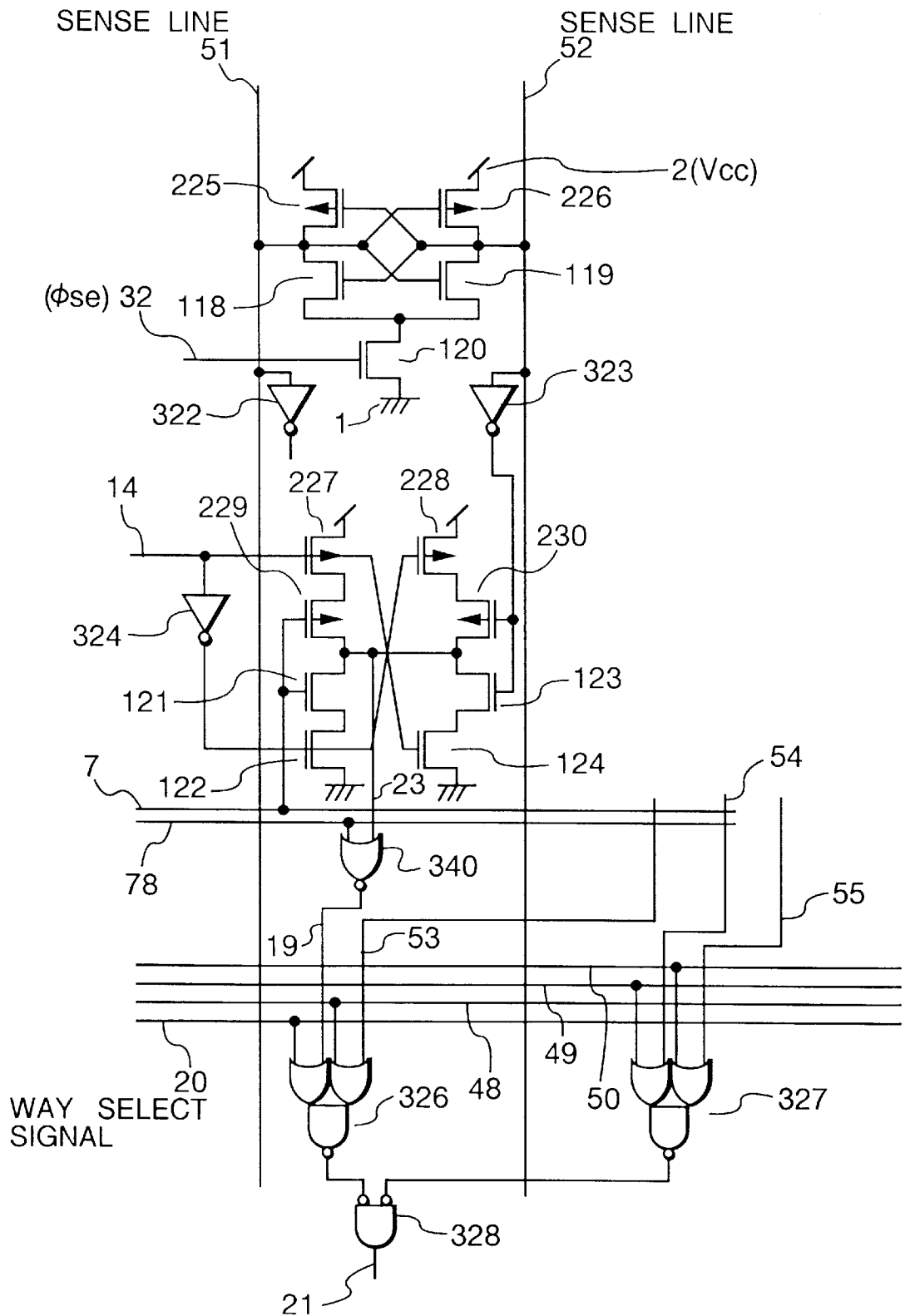
FIG. 18 is a circuit diagram of a selector circuit in a page size variable set-associative TLB practiced as a third embodiment of the invention.

FIG. 18 is a circuit diagram of the selector circuit 406 in the page size variable set-associative TLB practiced as the third embodiment of the invention. The selector circuit 406 of FIG. 18 is a variation of the selector circuit 406 in FIG. 8 with its inverter 325 replaced by a two-input NOR circuit 340.

One of the inputs of the NOR circuit 340 receives a sense line delay signal 78 that is driven Low at about the same time as the selector control signal 14. The other input of the NOR circuit 340 receives the unmodified input signal of the inverter 325 shown in FIG. 8.

Because the sense line delay signal 78 changes at about the same time as the selector control signal 14, the output 19 of the NOR circuit 340 remains Low until the sense line delay signal 78 goes Low.

Thus where the page size is 4KB, the input signal of the way selector circuit 405 remains unchanged even if the signals on the sense lines 51 and 52 are changed by a read operation before the selector control signal 14 changes from High to Low.

This means that the input signal of the way selector circuit 405 is prevented from changing before the selector control signal 14 is established, whereby the backward operation of the way selector circuit 405 is forestalled.

Figure 19:
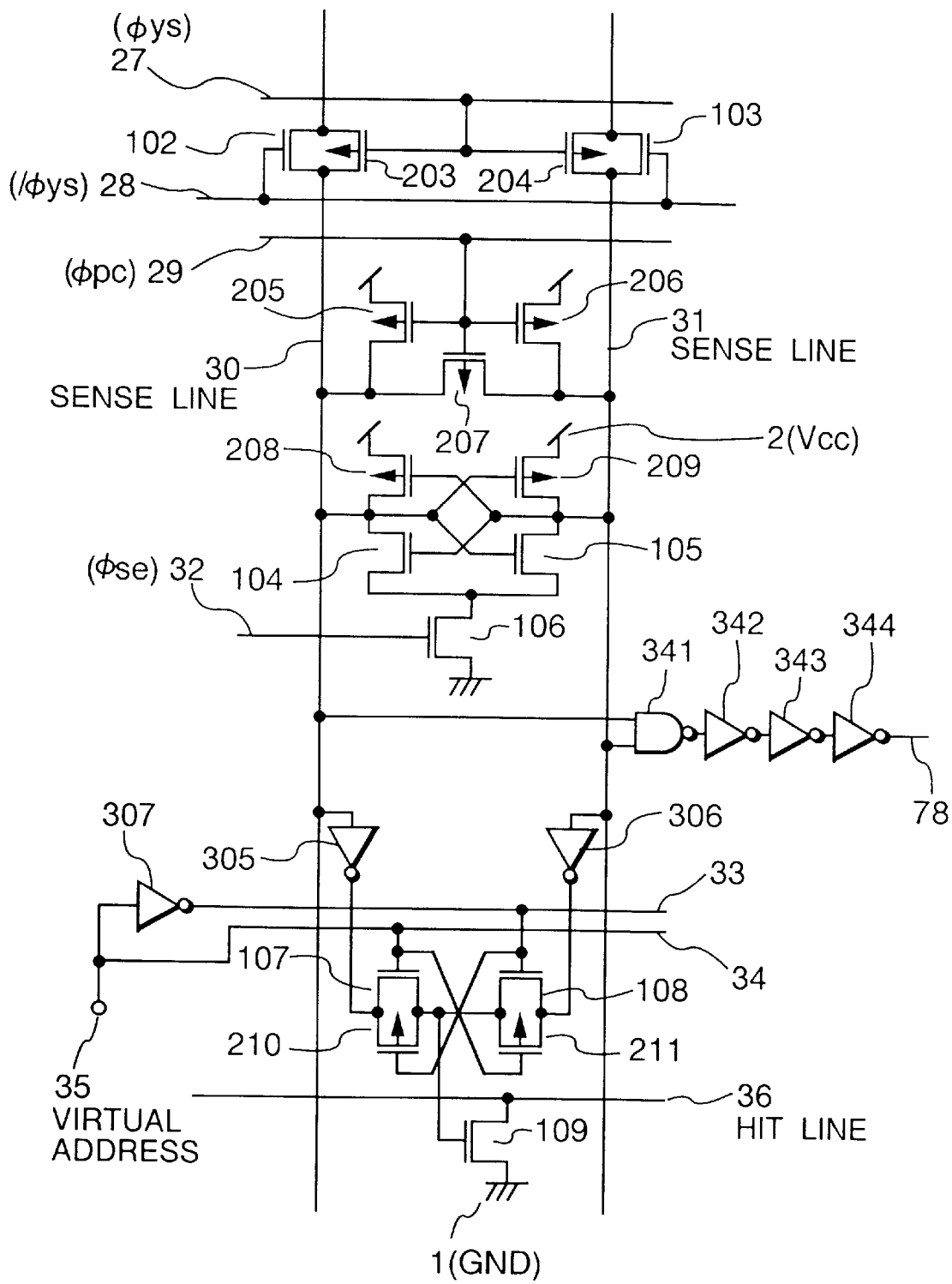
FIG. 19 is a circuit diagram of a delay signal generating circuit for generating a sense line delay signal included in FIG. 18.

FIG. 19 is a circuit diagram of a delay signal generating circuit for generating the sense line delay signal 78 included in FIG. 18.

The delay signal generating circuit comprises a two-input NAND circuit 341 and inverters 342, 343 and 344. The NAND circuit 341 generates the delay signal on the basis of the potential changes on sense lines 30 and 31 which are connected to the input terminals of the circuit 341.

In FIG. 19, the circuit arrangements other than the delay signal generating circuit are the same as those of the column circuit (comparator) for the address arrays 402 shown in FIG. 2.

In the wait state, the sense lines 30 and 31 have no potential difference because of the pre-charge operation. This keeps the sense line delay signal 78 High.

When a word line is selected and the read operation is started, the data lines in question and the sense lines 30 and 31 develop potential differences. When the sense amplifier composed of the MOS, transistors 104, 105, 106, 205 and 206 is operated, the potential difference between the sense lines 30 and 31 equals the supply voltage. This causes the sense line delay signal 78 to change from its wait state (High) to the Low state.

Upon receipt of the sense line delay signal 78, the selector circuit 406 of FIG. 18 outputs either bits 11 and 10 (VA[11 : 10]) 7 in the virtual address 505, or bits 11 and 10 (17) read from the field ([11 : 10]) 503 of the data arrays 403, provided that the sense line delay signal 78 is Low. Otherwise the two-input NOR circuit 340 outputs the Low signal.

As described, the selector circuit 406 of FIG. 18 causes one of the inputs of the two-input NOR circuit 340 to admit the sense line delay signal 78 having about the same delay as the selector control signal 14. This delays the output of the selector circuit 406, which in turn prevents an increase in the address translation time.

In the setup above, the input signal of the way selector circuit 405 remains unchanged and the physical address 21 stays Low regardless of any change in the input signal 23 of the two-input NOR circuit 340, until the sense line delay signal 78 changes.

Thereafter, the selector control signal 14 changes from High to Low, the offset address 7 of the virtual address 505 is selected, and the sense line delay signal 78 is driven Low, in that order. The NOR circuit 340 then acts as an inverter and outputs the signal selected by the selector circuit 406.

Where the way selector circuit 405 is structured as a dynamic circuit, the input signal of the NOR circuit 340 develops a change causing an increase in the address translation time if the value of bits 11-10 read from the field ([11 : 10]) of the data arrays 403 is 1 for all ways, if the page size is 4KB, and if the value of bits 11-10 (VA[11 : 10]) in the virtual address 505 is 0. The reasons for that change in the input signal of the NOR circuit 340 were discussed in connection with the circuit arrangements in FIGS. 8 and 9.

However, the third embodiment keeps the input of the OR-AND-NOT composite gate circuit 326 unchanged in the wait state until the selector control signal 14 is established. This is because the sense line delay signal 78 is a signal that is established with approximately the same delay as the selector control signal 14.

When the selector control signal 14 is established and the sense line delay signal 78 is brought Low, the input of the OR-NAND-NOT composite gate circuit 326 receives bits 11 and 10 (VA[11 : 10]) in the virtual address 505. The physical address 21 stays unchanged and is thus established to be Low.

In the manner described, the way selector circuit 405 prevents the address translation time from getting longer without operating in the backward direction (i.e., the output changing from High to Low).

In each page size variable set-associative TLB described above as an embodiment of the invention, address translation pairs of two page sizes (1KB and 4KB) are stored for each of the entries involved. Alternatively, address translation pairs of three or more page sizes may be stored for each entry.

Figure 20:
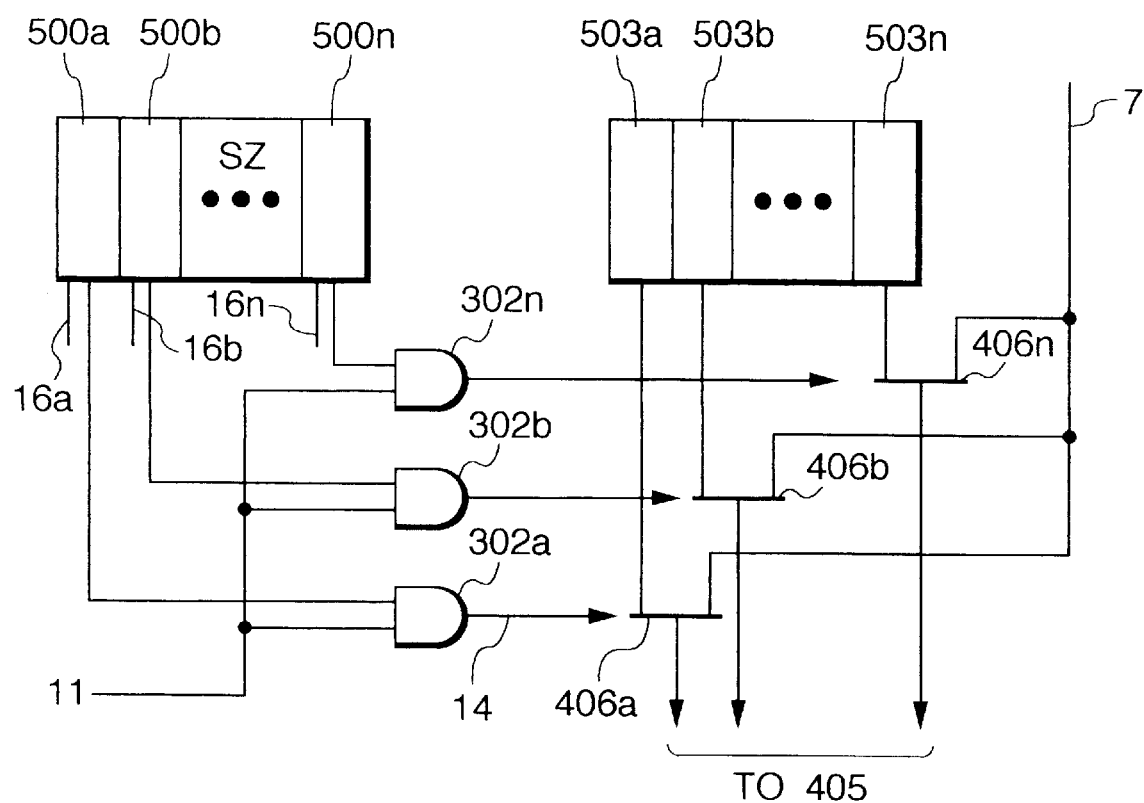
FIG. 20 is a block diagram showing key portions of the page size variable set-associative TLB for storing address translation pairs of at least three page sizes for each of the entries involved, the TLB being any one of the first, second and third embodiments.

FIG. 20 is a block diagram showing key portions of the page size variable set-associative TLB for storing address translation pairs of at least three page sizes for each of the entries involved. The TLB may be any one of the first, second and third embodiments already described. FIG. 20 shows circuit arrangements for one way only.

Where any one of the first, second and third embodiments of the invention is to store address translation pairs of three or more page sizes for each of the entries provided, the field SZ (500) for storing the page size of the address arrays 502 in FIG. 1 needs to be divided into a plurality of fields 500a, 500b, . . . , 500n.

Also divided into a plurality of fields 503a, 503b, . . . , 503n is the field 503 having the bit positions for storing a bit value designating either an intra-page address or a page number following a page size change for each entry in the data arrays 403.

The addresses read from the divided fields 503a, 503b, . . . , 503n of the data arrays 403 are input to the input terminals on one side of a plurality of selector circuits 406a, 406b, . . . 406n whose outputs are input to the way selector circuit 405. The input terminals on the other side of the plurality of selector circuits 406, 406b, . . . , 406n receive the input virtual address.

The plurality of selector circuits 406a, 406b, . . . , 406n are controlled respectively by the values read from the divided fields 500a, 500b, . . . , 500n of the address arrays 402.

In addition, a plurality of NAND circuits 302a, 302b, . . . , 302n are provided to allow the selector circuits 406a, 406b, . . . , 406n to select the addresses read respectively from the divided fields 503a, 503b, . . . , 503n of the data arrays 403 through the use of the control signal 11 as in the setup of FIG. 1.

Figure 21:
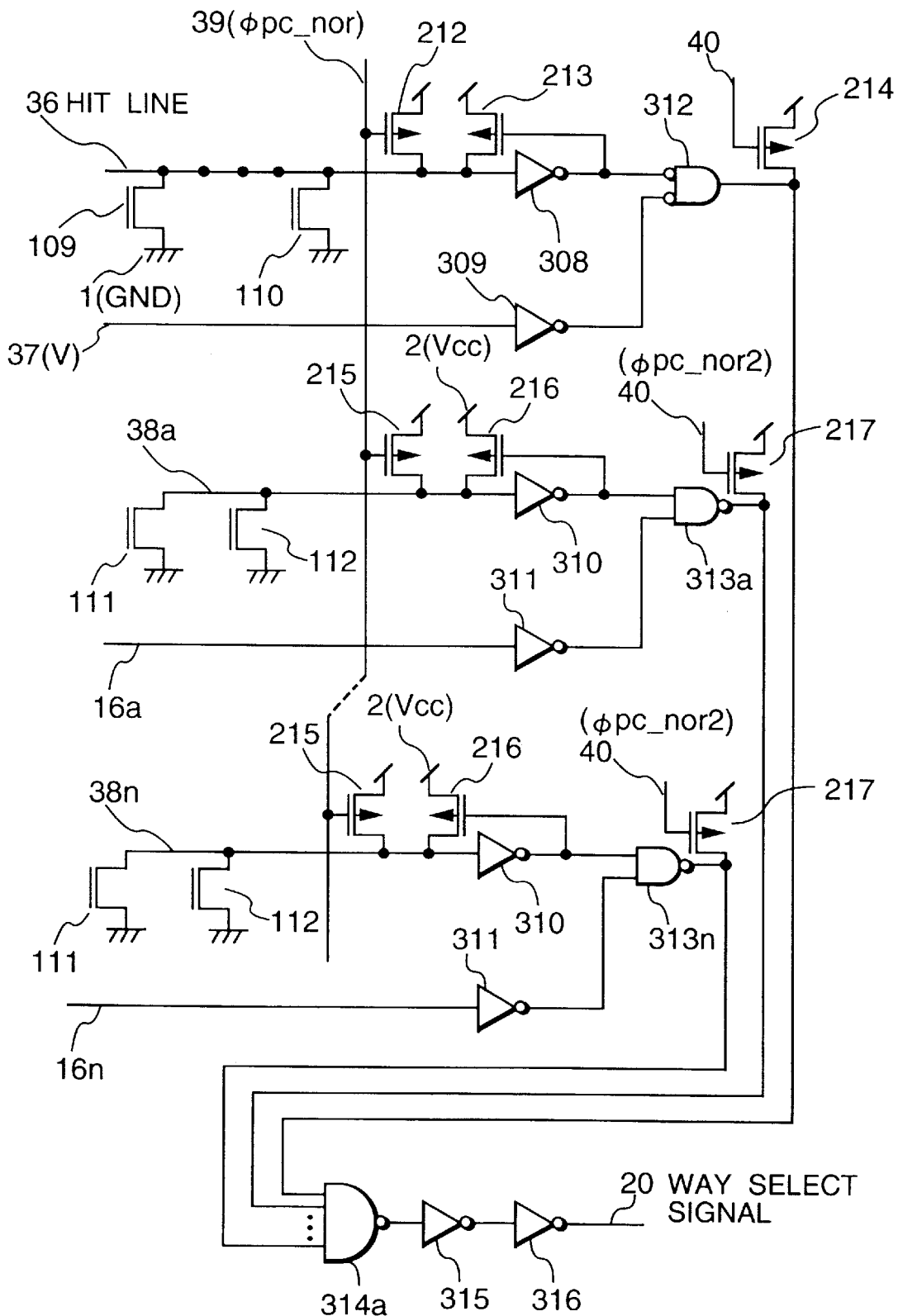
FIG. 21 is a circuit diagram of a way select signal generating circuit allowing the page size variable set-associative TLB to store address translation pairs of at least three page sizes for each of the entries involved, the TLB being any one of the first, second and third embodiments.

FIG. 21 is a circuit diagram of a way select signal generating circuit allowing the page size variable set-associative TLB to store address translation pairs of at least three page sizes for each of the entries involved. The TLB may be any one of the first, second and third embodiments.

Where any one of the first, second and third embodiments of the invention is to store address translation pairs of three or more page sizes for each of the entries provided, it is necessary for the comparators 404 to changes their ranges of address comparison (i.e., associative ranges) based on the values 16a,16b, . . . , 16n read from the divided fields 500a, 500b, 500n of the address arrays 402.

This requires having the way select signal generating circuit equipped with a plurality of NAND circuits 313a, 313b, . . . , 313n of which the input terminals on one side receive the values 16a, 16b, . . . , 16n read from the divided fields 500a, 500b, . . . , 500n of the address arrays 402, as shown FIG. 21. Furthermore, the NAND circuit 314 is replaced by a NAND circuit 314a having an (n+1) input arrangement.

With the scheme above in place, if the values read from the divided fields 500a, 500b, . . . , 500n of the address arrays 402 are 1, the outputs of the plurality of NAND circuits 313a, 313b, . . . , 313n are driven High. This makes it possible to exclude from the ranges of address comparison (associative ranges) the addresses in the locations corresponding to those of the divided fields 500a, 500b, . . . , 500n of the address arrays 402 from which the value 1 is read.

The major benefits of the present invention are summarized as follows:

(1) According to the invention, the second field in each of the address arrays stores the value indicating the page size, and the value read from the second field is used to vary the range of address comparison performed by the comparators. This makes it possible to compare the bits corresponding exactly to the page size stored in each entry of the address arrays. Where the page size is changed and the offset bit positions are varied, the correct offset value is always output.

(2) The invention adopts self-triggered dynamic comparator circuits as the comparators comparing the address array contents with the virtual address. Because self-triggered dynamic comparators do not require comparison timings, there is no need for extra timing margins. In addition, the amount of power consumed by the clock is reduced.

(3) According to the invention, the value of 1 or 0 is written beforehand to the second field in each of a plurality of data arrays. When a read operation is started, the previously written value in the second field allows the first selector to retain the state in effect prior to the read operation. This makes it possible to prevent the racing of signals and to ensure high-speed address translation.

(4) The invention as embodied herein causes the output of the second selector to be output to the first selector after the signal for selecting the first selector has been established. This prevents the racing of signals and permits high-speed address translation.

As many apparently different embodiments of this invention may be made without departing from the spirit and scope thereof, it is to be understood that the invention is not limited to the specific embodiments thereof except as defined in the appended claims.

What is claimed is:

1. A semiconductor integrated circuit device with a memory circuit for translating input virtual addresses to real addresses, said memory circuit comprising:

a plurality of address arrays each having a first field for storing part of a high-order address of a virtual address and a second field for storing the page size of the virtual address;

a plurality of data arrays each having a first field for storing part of a high-order address of a real address and a second field for storing at least the remainder of said high-order address of the real address;

a decoder for decoding an index address of an input virtual address so as to select specific arrays from said address arrays and said data arrays;

a plurality of comparators for varying the range of address comparison on the basis of the values read from the second fields selected by said decoder from said plurality of address arrays, said plurality of comparators further comparing the addresses read from the first fields selected by said decoder from said plurality of address arrays, with part of said high-order address of said input virtual address;

a plurality of second selectors acting, in accordance with the values read from the second fields selected by said decoder from said plurality of address arrays, to select either the real addresses read from the second fields selected by said decoder from said plurality of data arrays, or the address in a predetermined location of said input virtual address; and a first selector acting, on the basis of the result of comparisons by said plurality of comparators, to select one of the real addresses read from the first fields selected by said decoder from said plurality of data arrays, and one of the addresses selected by said plurality of second selectors.

2. A semiconductor integrated circuit device with a memory circuit according to claim 1, wherein the first fields of said plurality of address arrays each includes a memory cell made up of a plurality of memory elements on each array;

a data line pair connected to a plurality of memory cells and receiving complementary signals therefrom;

a sense line pair for receiving the potential of said data line pair via a switching element;

a plurality of pre-charge circuits for pre-charging said data line pair and said sense line pair with the potential of a power source;

a sense amplifier circuit for amplifying the difference in potential across said sense line pairs said difference stemming from the value read from the memory cell selected by said decoder; and a detection circuit for detecting the change in potential on said sense line pair; and wherein said plurality of comparators each includes;

a plurality of exclusive-OR circuits each having two input terminals, one of said two input terminals receiving the output of said detection circuit on each of said plurality of address arrays, the other input terminal receiving the value of each of the bits constituting a virtual address;

a plurality of NMOS transistors having gate electrodes fed with the outputs from said exclusive-OR circuits; and a hit line connected to the electrodes on one side of said plurality of NMOS transistors.

3. A semiconductor integrated circuit device with a memory circuit according to claim 1 or 2, said memory circuit further comprising writing means for writing data to the second field of each of said plurality of address arrays;

wherein, before a read operation is started, said plurality of second selectors select the real addresses read from the second fields selected by said decoder from said plurality of data arrays and input the selected real addresses to said first selector;

wherein, after said read operation is started, if the values read from the second fields selected by said decoder from said plurality of address arrays constitute values for selecting an address in a predetermined location of said input virtual address, said plurality of second selectors include input means for selecting said address in said predetermined location of said input virtual address in place of the real addresses read from the second fields of said plurality of data arrays and for inputting the selected address to said first selector; and wherein said writing means performs a predetermined logic operation between the values to be written to the second fields of said plurality of address arrays and the real addresses to be written to the second fields of said plurality of data arrays and, after said read operation is started, if said address in said predetermined location of said input virtual address is selected, said writing means writes to the second fields of said plurality of data arrays the value held by said first selector prior to said read operation.

4. A semiconductor integrated circuit device with a memory circuit according to claim 1 or 2, said memory circuit further comprising logic means disposed between said plurality of second selectors and said first selector;

wherein, before a read operation is started, said plurality of second selectors select the real addresses read from the second fields selected by said decoder from said plurality of data arrays;

wherein, after said read operation is started, if the values read from the second fields selected by said decoder from said plurality of address arrays constitute values for selecting an address in a predetermined location of said input virtual address, said plurality of second selectors include input means for selecting said address in said predetermined location of said input virtual address in place of the real addresses read from the second fields of said plurality of data arrays and for inputting the selected address to said first selector; and wherein said logic means performs a predetermined logic operation between the addresses selected by said plurality of second selectors and a signal having a delay equivalent to that of the values read from the second fields selected by said decoder from said plurality of address arrays, said logic means including output means for outputting the result of said logic operation to said first selector.

* * * * *

UNITED STATES PATENT AND TRADEMARK OFFICE
CERTIFICATE OF CORRECTION

PATENT NO. : 5,907,867
DATED : May 25, 1999
INVENTOR(S) : Shinbo et al.

It is certified that error appears in the above-identified patent and that said Letters Patent is hereby corrected as shown below:

Figure 17, "WRITLEN", should be --WRITTEN--;

Figure 17, "TERMONAL", should be --TERMINAL--.

Signed and Sealed this

Twenty-third Day of November, 1999

Attest:

Q. TODD DICKINSON

Attesting Officer

Acting Commissioner of Patents and Trademarks